US011153001B2

(12) United States Patent
Yu et al.

(10) Patent No.: US 11,153,001 B2
(45) Date of Patent: Oct. 19, 2021

(54) BEAM MANAGEMENT METHOD AND RELATED DEVICE

(71) Applicant: HUAWEI TECHNOLOGIES CO., LTD., Shenzhen (CN)

(72) Inventors: Xiaoyong Yu, Shanghai (CN); Bin Liu, San Diego, CA (US); Wei Huang, Shenzhen (CN); Qi Wang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/262,223

(22) PCT Filed: Jul. 19, 2019

(86) PCT No.: PCT/CN2019/096867
§ 371 (c)(1),
(2) Date: Jan. 22, 2021

(87) PCT Pub. No.: WO2020/020080
PCT Pub. Date: Jan. 30, 2020

(65) Prior Publication Data
US 2021/0258064 A1 Aug. 19, 2021

(30) Foreign Application Priority Data

Jul. 23, 2018 (CN) .......................... 201810813756.6
Nov. 2, 2018 (CN) .......................... 201811300660.6
Nov. 30, 2018 (CN) .......................... 201811459624.4

(51) Int. Cl.
H04B 7/06 (2006.01)
H04B 7/10 (2017.01)
(Continued)

(52) U.S. Cl.
CPC ........... *H04B 7/0695* (2013.01); *H04B 7/086* (2013.01); *H04B 7/10* (2013.01); *H04M 1/72454* (2021.01); *H04W 74/0841* (2013.01)

(58) Field of Classification Search
CPC ...... H04B 7/0695; H04B 7/086; H04B 7/088; H04B 7/10; H04B 7/08; H04B 7/0686;
(Continued)

(56) References Cited

U.S. PATENT DOCUMENTS 9,048,894 B2 * 6/2015 Wang ..................... H04B 7/043
9,425,880 B2 * 8/2016 Kim ..................... H04L 27/2628
(Continued)

FOREIGN PATENT DOCUMENTS

JP H11298953 A 10/1999
KR 20180060883 A 6/2018

OTHER PUBLICATIONS

3GPP TS 36.300 V15.2.0 (Jun. 2018),3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2(Release 15), total 357 pages.
(Continued)

*Primary Examiner* — James M Perez

(57) ABSTRACT

A beam management method includes: A terminal device determines a first UE posture of the terminal device in a process in which the terminal device receives, by using a first receive beam, information sent by a network device, where the terminal device includes a plurality of receive beams; when the terminal device is changed from the first UE posture to a second UE posture, the terminal device determines a second receive beam based on a direction relationship between the plurality of receive beams and a direction change status during a change from the first UE
(Continued)

posture to the second UE posture; and the terminal device receives, by using the second receive beam, the information sent by the network device.

20 Claims, 12 Drawing Sheets

(51) Int. Cl.
*H04M 1/72454* (2021.01)
*H04W 74/08* (2009.01)
*H04B 7/08* (2006.01)

(58) Field of Classification Search
CPC ....... H04B 7/0868–0877; H04B 7/0802–0814; H04W 74/0841; H01Q 3/24; H04M 1/72454
See application file for complete search history.

(56) References Cited

U.S. PATENT DOCUMENTS

| | | | | |
|---|---|---|---|---|
| 9,800,304 | B2* | 10/2017 | Kim | H04B 7/0469 |
| 9,867,192 | B2* | 1/2018 | Krzymien | H04B 7/0639 |
| 10,389,509 | B2* | 8/2019 | Stirling-Gallacher | H04W 72/1231 |
| 10,433,311 | B2* | 10/2019 | Zeng | H04W 72/1289 |
| 10,455,539 | B2* | 10/2019 | Raghavan | H04W 4/023 |
| 10,637,558 | B2* | 4/2020 | Wang | H04W 4/021 |
| 10,652,777 | B2* | 5/2020 | Zeng | H04W 16/28 |
| 10,720,987 | B2* | 7/2020 | Wang | H04W 72/046 |
| 10,879,610 | B2* | 12/2020 | Lou | H01Q 3/38 |
| 10,931,348 | B2* | 2/2021 | Chavva | H04W 24/08 |
| 10,932,213 | B2* | 2/2021 | Wang | H04B 7/088 |
| 10,958,325 | B1* | 3/2021 | Park | H04B 7/088 |
| 11,025,329 | B2* | 6/2021 | Takano | H04B 7/0695 |
| 2010/0014463 | A1* | 1/2010 | Nagai | H04W 72/0426 370/328 |
| 2014/0323143 | A1* | 10/2014 | Jung | H04L 5/0025 455/452.1 |
| 2016/0337916 | A1* | 11/2016 | Deenoo | H04W 36/0088 |
| 2017/0207845 | A1* | 7/2017 | Moon | H04B 7/0695 |
| 2017/0256988 | A1* | 9/2017 | Joyce | H02J 50/10 |
| 2018/0146419 | A1* | 5/2018 | Raghavan | H04B 7/0456 |
| 2018/0152231 | A1* | 5/2018 | Jeong | H04B 7/0857 |
| 2018/0191422 | A1* | 7/2018 | Xia | H04B 7/061 |
| 2018/0205421 | A1* | 7/2018 | Park | H04B 17/318 |
| 2018/0219606 | A1* | 8/2018 | Ng | H04L 5/0053 |
| 2018/0242273 | A1* | 8/2018 | Takahashi | H04B 7/0695 |
| 2018/0254808 | A1* | 9/2018 | Kobayashi | H04B 7/0639 |
| 2018/0302141 | A1* | 10/2018 | Kutz | H04B 7/043 |
| 2019/0013857 | A1* | 1/2019 | Zhang | H04B 7/0617 |
| 2019/0044593 | A1* | 2/2019 | John Wilson | H04W 72/085 |
| 2019/0090143 | A1* | 3/2019 | Luo | H04B 7/0626 |
| 2019/0150013 | A1* | 5/2019 | Zhang | H04W 24/10 375/224 |
| 2019/0165983 | A1* | 5/2019 | Nakayama | H04W 56/001 |
| 2019/0182786 | A1* | 6/2019 | Wang | H04W 56/0015 |
| 2019/0238202 | A1* | 8/2019 | Chavva | H04W 24/08 |
| 2019/0253108 | A1* | 8/2019 | Zhang | H04B 7/0404 |
| 2019/0306726 | A1* | 10/2019 | Mo | H04B 7/0404 |
| 2019/0356439 | A1* | 11/2019 | Lee | H04B 7/0408 |
| 2019/0356524 | A1* | 11/2019 | Yi | H04W 48/16 |
| 2019/0393944 | A1* | 12/2019 | Huang | H04W 72/085 |
| 2020/0076488 | A1* | 3/2020 | Brunel | H04B 7/0608 |
| 2020/0112347 | A1* | 4/2020 | Fukui | H04W 16/28 |
| 2020/0145080 | A1* | 5/2020 | Tang | H04B 7/088 |
| 2020/0212991 | A1* | 7/2020 | Cho | H04B 17/309 |
| 2020/0274400 | A1* | 8/2020 | Yeo | H02J 50/90 |
| 2020/0313827 | A1* | 10/2020 | Noh | H04L 5/0057 |
| 2020/0328797 | A1* | 10/2020 | Gajula | H04W 52/367 |
| 2020/0358515 | A1* | 11/2020 | Li | H04B 7/0617 |
| 2020/0389238 | A1* | 12/2020 | Cai | H04B 7/0456 |
| 2020/0395993 | A1* | 12/2020 | Ryu | H04W 64/003 |
| 2020/0404644 | A1* | 12/2020 | Zhu | H04W 64/006 |
| 2021/0051489 | A1* | 2/2021 | Li | H04B 7/0617 |
| 2021/0076228 | A1* | 3/2021 | Han | H04B 7/0882 |
| 2021/0099221 | A1* | 4/2021 | Park | H04B 17/318 |
| 2021/0099832 | A1* | 4/2021 | Duan | H04W 4/70 |
| 2021/0105867 | A1* | 4/2021 | Akkarakaran | H04W 56/0045 |
| 2021/0111778 | A1 | 4/2021 | Jung et al. | |
| 2021/0112439 | A1* | 4/2021 | Leung | H04L 43/0829 |

OTHER PUBLICATIONS

European Patent Office Supplementary European Search Report for EP 19840751 dated Jun. 30, 2021, 54 pages.

* cited by examiner

BEAM MANAGEMENT METHOD AND RELATED DEVICE

This application is a national stage of International Application No. PCT/CN2019/096867, filed on Jul. 19, 2019, which claims priority to Chinese Patent Application No. 201811459624.4, filed on Nov. 30, 2018 and Chinese Patent Application No. 201811300660.6, filed on Nov. 2, 2015 and Chinese Patent Application No. 201810813756.6, filed on Jul. 23, 2018. All of the aforementioned applications are hereby incorporated by reference in their entireties.

TECHNICAL FIELD

This application relates to the field of communications technologies, and in particular, to a beam management method and a related device.

BACKGROUND

The development of wireless network technologies and applications has come to the age of the 5th generation (5G), and the 3rd generation partnership project (3GPP) R15 release had been frozen in June 2018. 3GPP defines three main directions of 5G application scenarios: enhanced mobile broadband (eMBB), massive machine type communications (eMTC), and ultra-reliable and low latency communications (uRLLC). eMBB can provide an uplink/downlink throughput of 10G bits per second for each cell. To obtain such bandwidth, eMBB uses a wider spectrum resource, and extends from a low frequency band used by a long term evolution (LTE) technology to a high frequency band (for example, may reach 100 GHz).

An electromagnetic wave in a high frequency band is characterized by a high path loss. To overcome a relatively large propagation loss caused by a high frequency band and implement better cell coverage, a signal transmission mechanism based on a beamforming technology is used, to compensate for a transmission loss in a signal propagation process by using a relatively large antenna gain.

In the prior art, when a signal is transmitted based on the beamforming technology, once a user moves or a posture of user equipment (UE) is changed (for example, the user equipment is rotated), a direction of a formed beam corresponding to the transmitted signal may no longer match a posture of the rotated UE. As a result, the UE cannot complete random access, or has poor performance after random access and encounters frequent signal receiving interruptions. In this case, switching needs to be performed between different formed beams, and beam sweeping and beam training need to be performed on both a formed transmit beam and a formed receive beam again, to select a transmit-receive beam pair that meets an access condition. The entire process is relatively cumbersome. In addition, in a scenario in which a UE posture changes rapidly, UE cannot make a response in a timely manner, to switch to a proper formed beam for signal transmission.

SUMMARY

Various embodiments provide a beam management method and a related device, to reduce a quantity of times UE repeatedly sweeps physical space and improve sweeping efficiency when a terminal device posture is changed.

According to a first aspect, a beam management method is provided. The method includes: a terminal device determines a first UE posture of the terminal device in a process in which the terminal device receives, by using a first receive beam, information sent by a network device, where the terminal device includes a plurality of receive beams; when the terminal device is changed from the first UE posture to a second UE posture, the terminal device determines a second receive beam based on at least a direction relationship between the plurality of receive beams and a direction change status of the terminal device when changing from the first UE posture to the second UE posture; and the terminal device receives, by using the second receive beam, the information sent by the network device.

In a solution provided by this embodiment, if a UE posture of the terminal device is changed in the process of receiving the information sent by the network device, the terminal device determines, based on the direction relationship between the plurality of receive beams and the direction change status of the UE posture, the second receive beam obtained after the posture change. In this way, it can be ensured that the information sent by the network device can be received in a timely manner by using the second receive beam when the UE posture is changed. Therefore, in a solution provided by this embodiment, when the terminal device posture is changed, a quantity of times of repeated physical space sweeping can be reduced, sweeping efficiency can be improved, and a random access success rate can be increased. In addition, measurement frequency based on a reference signal can be reduced, power consumption can be reduced, and link robustness can be improved.

It may be understood that the terminal device posture includes but is not limited to a UE posture, a terminal posture, and a user posture.

With reference to the first aspect, in one implementation of the first aspect, the information sent by the network device includes synchronization reference information, and the synchronization reference information includes a channel state information-reference signal and/or a synchronization sequence block reference signal.

In a solution provided by this embodiment, the network device sends the channel state information-reference signal or the synchronization sequence reference signal to the terminal device by using a transmit beam, and the terminal device receives the channel state information-reference signal or the synchronization sequence reference signal by using different receive beams, to implement a beam sweeping process.

With reference to the first aspect, in one implementation of the first aspect, received power of the channel state information-reference signal or the synchronization sequence block reference signal received by using the first receive beam is greater than a first threshold.

In a solution provided by this embodiment, the terminal device measures the received power of the received channel state information-reference signal or synchronization sequence reference signal, and determines a receive beam that meets a condition (for example, received power is greater than a first threshold) as the first receive beam, so that an entire determining process is easy to implement.

With reference to the first aspect, in one implementation of the first aspect, in the process in which the terminal device receives, by using the first receive beam, the information sent by the network device, if the plurality of receive beams have a blocked receive beam, the first receive beam does not include the blocked receive beam.

In a solution provided by this embodiment, the terminal device detects a blocking status of the receive beams in advance, so that efficiency of entire beam sweeping can be improved, and unnecessary measurement on received power of the blocked receive beam can be reduced.

With reference to the first aspect, in one implementation of the first aspect, when the terminal device is changed from the first UE posture to the second UE posture, if the plurality of receive beams have a blocked receive beam, the second receive beam does not include the blocked receive beam.

In a solution provided by this embodiment, when the UE posture is changed, the terminal device detects a blocking status of the receive beams in advance, so that efficiency of an entire process of determining the second receive beam can be improved, and unnecessary measurement on received power of the blocked receive beam can be reduced.

With reference to the first aspect, in one implementation of the first aspect, in the process in which the terminal device receives, by using the first receive beam, the information sent by the network device, the terminal device obtains a UE posture parameter n times, calculates an average of UE posture parameters obtained n times, and determines a UE posture corresponding to the average as the first UE posture, where n is a positive integer greater than or equal to 1.

In a solution provided by this embodiment, the terminal device obtains the UE posture parameter a plurality of times, calculates the average of the parameters, and determines the UE posture corresponding to the average as the first UE posture, so that it can be ensured that the obtained first UE posture is more accurate and an error is effectively avoided.

With reference to the first aspect, in one implementation of the first aspect, in a random access process, if the second UE posture is a posture corresponding to the terminal device when the terminal device sends a random access preamble, before the terminal device receives, by using the second receive beam, the information sent by the network device, the method further includes: the terminal device sends the random access preamble by using the second receive beam.

In a solution provided by this embodiment, if the UE posture of the terminal device is changed when the terminal device sends the random access preamble, the terminal device sends the random access preamble by using the second receive beam in the second UE posture, so that it can be ensured that the network device can receive the random access preamble sent by the terminal device, to complete the random access process.

With reference to the first aspect, in one implementation of the first aspect, in a random access process, if the second UE posture is a posture corresponding to the terminal device when the terminal device receives a random access response sent by the network device, that the terminal device receives, by using the second receive beam, the information sent by the network device includes: the terminal device receives, by using the second receive beam, the random access response sent by the network device.

In a solution provided by this embodiment, if the posture of the terminal device is changed in a process of receiving the random access response sent by the network device, the terminal device receives the random access response by using the second receive beam, so that it can be ensured that the terminal device can accurately receive the random access response sent by the network device, to complete the random access process.

With reference to the first aspect, in one implementation of the first aspect, in a contention-based random access process, if the second UE posture is a posture corresponding to the terminal device when the terminal device receives a contention resolution response message sent by the network device, that the terminal device receives, by using the second receive beam, the information sent by the network device includes: the terminal device receives, by using the second receive beam, the contention resolution response message sent by the network device.

In a solution provided by this embodiment, if the posture of the terminal device is changed in a process of waiting for a contention resolution response, the terminal device receives the contention resolution response message by using the second receive beam, so that it can be ensured that the contention resolution response message sent by the network device can be accurately received, to improve access efficiency and increase a success rate.

With reference to the first aspect, in one implementation of the first aspect, when the terminal device is in a connected discontinuous reception state or an idle discontinuous reception state, the first UE posture includes a posture corresponding to the terminal device before the terminal device enters sleep, and the second UE posture includes a posture corresponding to the terminal device when the terminal device wakes up.

In a solution provided by this embodiment, the terminal device may record the posture existing before the terminal device enters sleep and the posture existing when the terminal device wakes up, and adjust a receive beam based on a change in the UE postures at the two moments, so that it can be ensured that when waking, the terminal device can accurately receive, by using a proper receive beam, the information sent by the network device.

With reference to the first aspect, in one implementation of the first aspect, after the terminal device determines the first UE posture of the terminal device in the process in which the terminal device receives, by using the first receive beam, the information sent by the network device, the method further includes:

in the process in which the terminal device receives, by using the first receive beam, the information sent by the network device, if received power of synchronization reference information received by the terminal device in a third UE posture is greater than received power of the synchronization reference information received by the terminal device in a fourth UE posture, the terminal device corrects the first UE posture to the third UE posture.

In a solution provided by this embodiment, in a process of adjusting a receive beam based on a posture change, the terminal device corrects and updates the posture change of the terminal device based on detection of the synchronization reference information, so that an error accumulated by adjusting the receive beam based only on the posture change can be eliminated, and it can be ensured that the information sent by the network device can be received by using a proper receive beam when the UE posture is changed.

With reference to the first aspect, in one implementation of the first aspect, when the plurality of receive beams are formed by using a single-polarized antenna, the method further includes:

if a rotation angle between the first UE posture and the second UE posture is less than a second threshold, a polarization direction of the second receive beam is the same as a polarization direction of the first receive beam; or if a rotation angle between the first UE posture and the second UE posture is greater than a first threshold, a polarization direction of the second receive beam is different from a polarization direction of the first receive beam.

In a solution provided by this embodiment, in a process in which the UE posture is changed, the terminal device determines a rotation angle corresponding to the posture change, and selects a receive beam with a proper polarization direction, so that it can be ensured that the information sent by the network device can be accurately received.

According to a second aspect, a terminal device is provided. The terminal device may be user equipment (user equipment, UE), or may be a chip in the user equipment. The terminal device has a function of implementing the terminal device in the first aspect. The function may be implemented by hardware, or may be implemented by hardware by executing corresponding software. The hardware or the software includes one or more units corresponding to the function.

In one design, when the terminal device is UE, the terminal device includes a processing module and a transceiver module. The processing module may be, for example, a processor. The transceiver module may be, for example, a transceiver, and the transceiver may include a radio frequency circuit and a baseband circuit. The transceiver module is configured to support communication between the terminal device and a network device or another terminal device. In an example, the transceiver module may further include a sending module and a receiving module. For example, the receiving module is configured to receive information sent by the access network device; and the processing module is configured to determine a first UE posture of the terminal device in a process in which the terminal device receives, by using a first receive beam, information sent by the network device, where the terminal device includes a plurality of receive beams; and is configured to: when the terminal device is changed from the first UE posture to a second UE posture, determine a second receive beam based on a direction relationship between the plurality of receive beams and a direction change status of the terminal device when changing from the first UE posture to the second UE posture. Optionally, the terminal device may further include a memory. The memory is configured to be coupled to the processor, and stores a program instruction and data that are necessary for the terminal device.

In another design, the terminal device includes a processor, a baseband circuit, a radio frequency circuit, and an antenna. The processor is configured to control a function of each circuit part, and the baseband circuit, the radio frequency circuit, and the antenna are configured to indicate communication between the terminal device and a network device. For example, in downlink communication, the radio frequency circuit may perform processing such as digital conversion, filtering, amplification, and down-conversion on information that is sent by the network device and that is received by using the antenna, and then decode processed information by using the baseband circuit and decapsulate decoded information according to a protocol to obtain a message carried in the decoded information. Optionally, the terminal device further includes a memory. The memory stores a program instruction and data that are necessary for the terminal device. In uplink communication, the baseband circuit generates a message that needs to be sent, the radio frequency circuit performs processing such as analog conversion, filtering, amplification, and up-conversion on the message, and the antenna sends a processed message to the network device.

In still another implementation, the terminal device includes a processor and a modem. The processor may be configured to instruct or operate a system, to control a function of the terminal device. The modem may, for example, encapsulate, encode/decode, modulate/demodulate, and equalize, data according to a protocol to generate a message that needs to be reported, to support the terminal device in executing the corresponding function in the first aspect. The modem may be further configured to receive information sent by a network device.

In still another implementation, when the terminal device is a chip in user equipment UE, the chip includes a processing module and a transceiver module. The processing module may be, for example, a processor. The processor herein may be configured to perform processing such as filtering, demodulation, power amplification, and decoding on a data packet that carries information and that is received by using the transceiver module. The transceiver module may be, for example, an input/output interface, a pin, or a circuit in the chip. The processing module may execute a computer-executable instruction stored in a storage unit, to support the terminal device in executing the corresponding function in the first aspect. Optionally, the storage unit may be a storage unit inside the chip, for example, a register or a cache. Alternatively, the storage unit may be a storage unit outside the chip but inside the terminal device, for example, a read-only memory (read-only memory, ROM for short), another type of static storage device that can store static information and an instruction, or a random access memory (random access memory, RAM for short).

In still another implementation, the apparatus includes a processor. The processor is configured to be coupled to a memory, read an instruction from the memory, and execute the function of the terminal device in the first aspect based on the instruction. The memory may be located inside the processor, or may be located outside the processor.

According to a third aspect, a non-transitory computer storage medium is provided, including an instruction. When the instruction is run on a terminal device, the terminal device is enabled to perform the method according to any one of the first aspect or the implementations of the first aspect.

DESCRIPTION OF EMBODIMENTS

Figure 1:
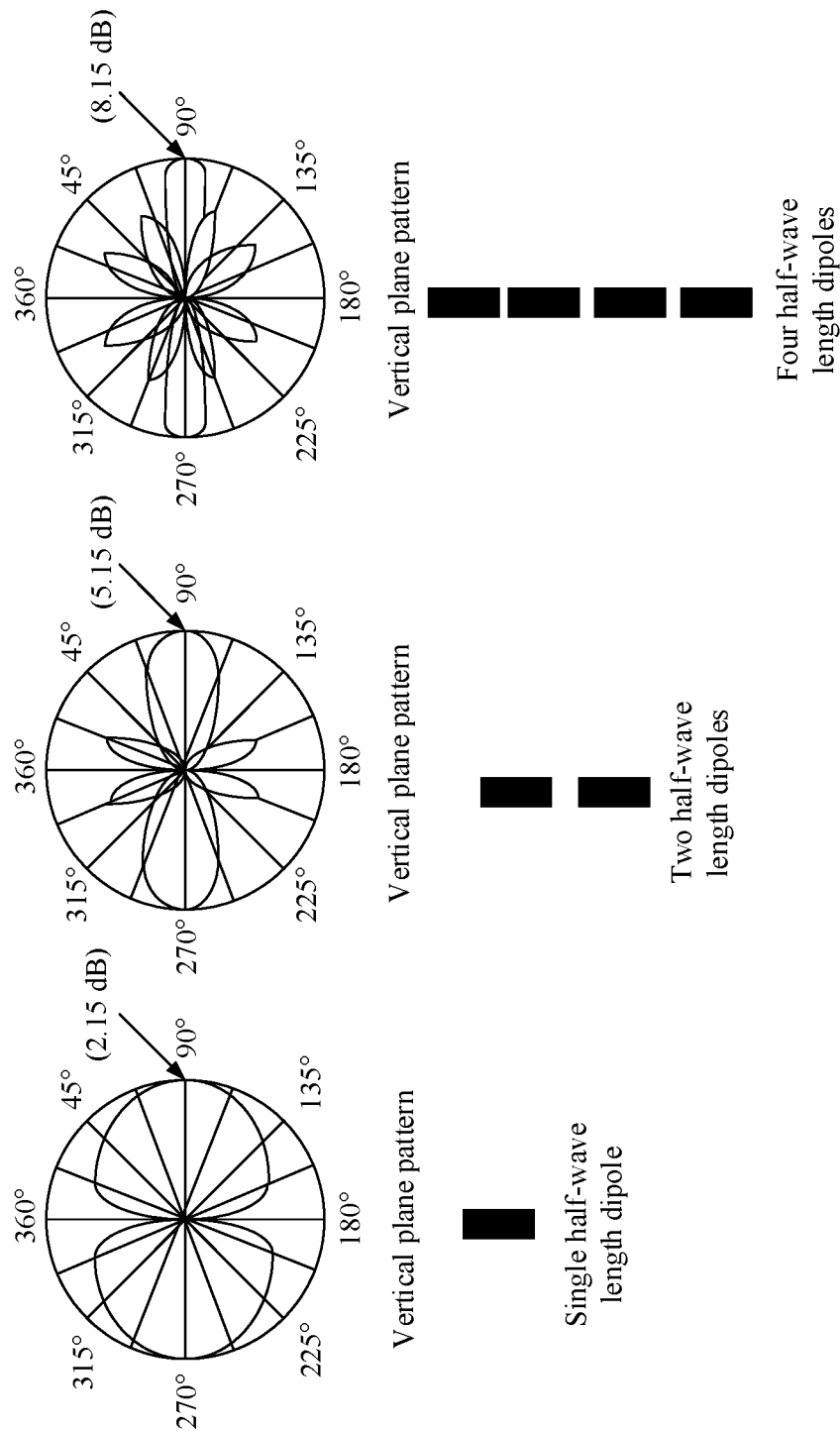
FIG. 1 is a schematic diagram of beamforming according to an embodiment of this application.

The following describes technical solutions of this application with reference to accompanying drawings.

The technical solutions in various embodiments in accordance with the present disclosure may be applied to a long term evolution (LTE) architecture, and may be further applied to a universal mobile telecommunications system (UMTS) terrestrial radio access network (UTRAN) architecture, or a global system for mobile communications (GSM) enhanced data rates for GSM Evolution (EDGE) system radio access network (GERAN) architecture. In the UTRAN architecture or the GERAN architecture, a function of a mobility management entity (MME) is implemented by a serving general packet radio service (GPRS) support node (SGSN), and a function of an SGW\a PGW is implemented by a gateway GPRS support node (GGSN). The technical solutions in the embodiments of the present invention may be further applied to another communications system, for example, a public land mobile network (PLMN) system, or even a future 5G communications system or a post-5G communications system. This is not limited in the embodiments of the present invention.

Various embodiments in accordance with the present disclosure relate to a terminal device. The terminal device may be a device that includes a wireless receiving and sending function and that may cooperate with a network device to provide a communication service for a user. For example, the terminal device may be user equipment (UE), an access terminal, a subscriber unit, a subscriber station, a mobile station, a mobile console, a remote station, a remote terminal, a mobile device, a user terminal, a terminal, a wireless communications device, a user agent, or a user apparatus. For example, the terminal device may be a cellular phone, a cordless phone, a session initiation protocol (SIP) phone, a wireless local loop (WLL) station, a personal digital assistant (PDA), a handheld device having a wireless communication function, a computing device, another processing device connected to a wireless modem, a vehicle-mounted device, a wearable device, or a terminal device in a future 5G network or a post-5G network. This is not limited in the embodiments of the present invention.

Various embodiments in accordance with the present disclosure further relate to a network device. The network device may be a device configured to communicate with a terminal device. For example, the network device may be a base transceiver station (Base Transceiver Station, BTS) in a GSM system or a CDMA system, may be a NodeB (NodeB, NB) in a WCDMA system, or may be an evolved NodeB (Evolutional Node B, eNB or eNodeB) in an LTE system. Alternatively, the network device may be a relay station, an access point, a vehicle-mounted device, a wearable device, a network-side device in a future 5G network or a post-5G network, a network device in a future evolved PLMN network, or the like.

The network device in various embodiments in accordance with the present disclosure may also be referred to as a radio access network (Radio Access Network, RAN) device. The RAN device corresponds to different devices in different communications systems, for example, corresponds to a base station and a base station controller in a 2G system, corresponds to a base station and a radio network controller (Radio Network Controller, RNC) in a 3G system, corresponds to an evolved NodeB (Evolutional Node B, eNB) in a 4G system, and corresponds to a 5G system in a 5G system, for example, an access network device (such as a gNB, a CU, or a DU) in a new radio access system (New Radio Access Technology, NR).

To facilitate understanding of the present disclosure, related technical knowledge in various embodiments in accordance with the present disclosure is first described herein.

In wireless communication, an electromagnetic wave may be managed to be propagated in a specific direction, so that users in different space can simultaneously use all spectrum resources to perform communication without interruption, namely, space division multiplexing (SDMA). When radio signals are radiated in all directions in space, only a small part of signal energy is received by a receiver as a wanted signal, and most signals are not received by corresponding receivers, but are radiated to other receivers as interference signals. When SDMA is used, signal energy is concentrated in a specific direction, which alleviates both interference to other receivers and a waste of signal energy. In 5G communication, SDMA is an important application example of a massive multiple-input multiple-output (MIMO) technology. To be specific, a massive transmit antenna array and a massive receive antenna array are respectively used at a transmit end and a receive end, to enable a signal to be transmitted and received by using the massive antenna arrays between the transmit end and the receive end, thereby improving communication quality. A technology of propagating a radio signal (an electromagnetic wave) only in a specific direction is referred to as beamforming.

A radiation direction of the electromagnetic wave is determined based on a characteristic of an antenna, and directivity of the antenna may be described by using a radiation pattern (namely, amplitudes of a signal transmitted by the antenna in different directions in space). A radiation pattern of a common antenna has very weak directivity (in other words, radiation intensities in all directions are similar). However, a basic beamforming method is using an antenna with strong radiation directivity (in other words, an antenna radiating in one direction, similar to a flashlight). In addition, for beamforming, a beam direction needs to change as a relative location between a receive end and a transmit end changes. In a conventional method for forming a beam by using a single antenna, a beam direction needs to change by mechanically rotating an antenna. Therefore, an intelligent antenna array is used in a practical beamforming solution.

FIG. 1 is a schematic diagram of beamforming. As shown in FIG. 1, when a single half-wave length dipole is vertically placed, a vertical plane pattern gain corresponding to the single half-wave length dipole is 2.15 decibels (dB); when two half-wave length dipoles are arranged in a vertically placed linear array, a vertical pattern gain corresponding to the two half-wave length dipoles is 5.15 dB; and when four half-wave length dipoles are arranged in a vertically placed linear array, a vertical plane pattern gain corresponding to the four half-wave length dipoles is 8.15 dB. It can be learned that, when a larger quantity of half-wave length dipoles are arranged in a vertically placed linear array, the larger quantity of half-wave length dipoles correspond to a larger vertical pattern gain. In beamforming, a relative phase and amplitude between a transmit wave and a receive wave may be controlled, to enable both electromagnetic wave radiation and receive gains to be concentrated in one direction.

Figure 2A:
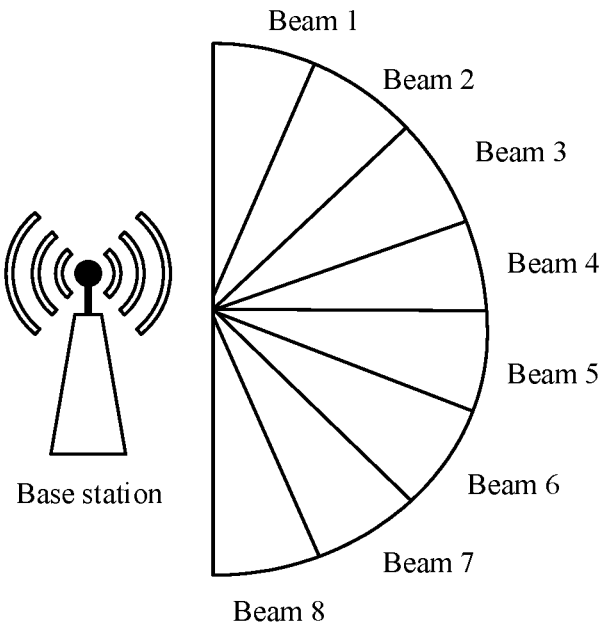
FIG. 2A is a schematic diagram of transmit beams of a base station according to an embodiment of this application.
Figure 2B:
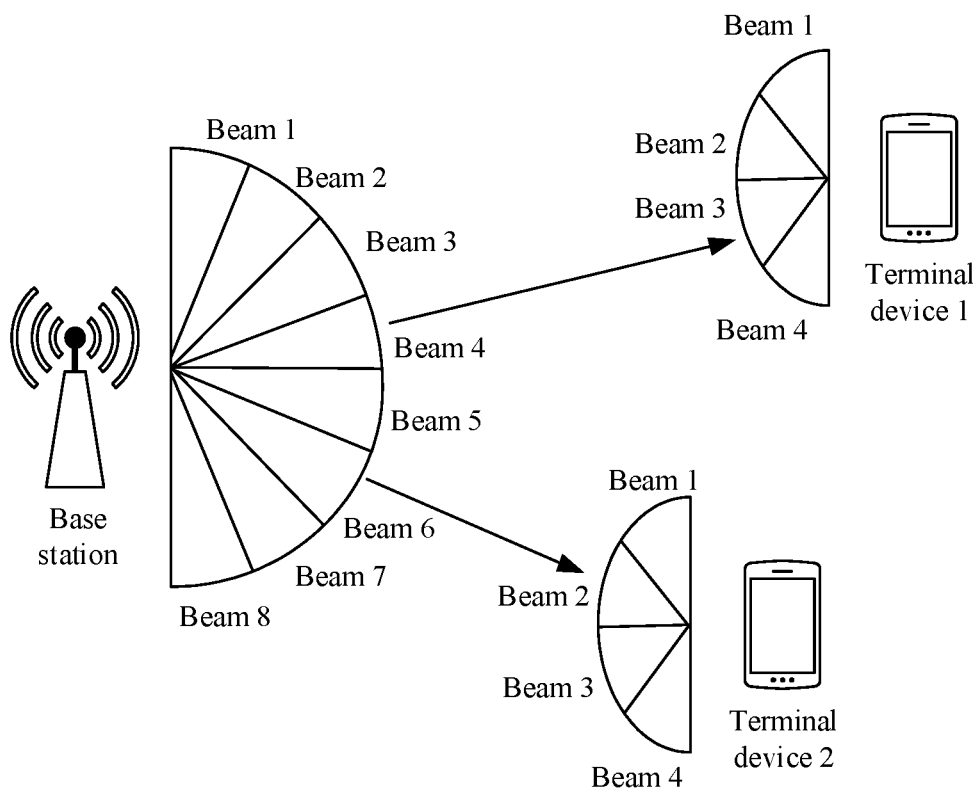
FIG. 2B is a schematic diagram of a working beam pair according to an embodiment of this application.

After the beamforming technology is used, a base station needs to use a plurality of beams with different directions to fully cover a cell. FIG. 2A is a schematic diagram of transmit beams of a base station. As shown in FIG. 2A, the base station uses eight beams to cover a cell served by the base station. In a downlink process (namely, wireless transmission from the base station to a terminal device), the base station transmits radio signals by sequentially using beams with different directions, and this process is referred to as beam sweeping (beam measurement). In addition, the terminal device measures radio signals transmitted by the different beams, and reports related information to the base station. The base station determines, based on the related information reported by the terminal device, a best transmit beam aligned with the terminal device. If the terminal device also has an antenna array, in a beam alignment process, receive beams need to be considered in addition to the transmit beams. Therefore, the 5G standard allows the terminal device to change between different receive beams for the transmit beams and select a best receive beam from the different receive beams, so that a beast beam pair (one transmit beam and one receive beam) is obtained. FIG. 2B is a schematic diagram of a working beam pair. As shown in FIG. 2B, a transmit beam 4 of a base station and a receive beam 3 of a terminal device 1 are aligned to a best degree, and a transmit beam 6 of the base station and a receive beam 2 of a terminal device 2 are aligned to a best degree. Therefore, best beam pairs corresponding to the terminal device 1 and the terminal device 2 are respectively (beam 4, beam 3) and (beam 6, beam 2).

It should be noted that before random access is initiated, all or some of beams on a base station side and all or some of beams on a terminal device side need to be swept, and then a beam pair that reaches an access threshold or has optimal performance is found from measured beam pairs for random access. If the found beam pair is not matched anymore because a posture location of a terminal device is changed (for example, the terminal device is rotated) in a beam sweeping process or a random access process, excessive random access time or a random access failure may be caused.

Various embodiments provide a beam management method, to resolve a problem that sweeping efficiency and a random access success rate are low when a terminal device posture is changed; and reduce measurement frequency that is based on a reference signal, reduce power consumption, and improve link robustness.

Figure 3:
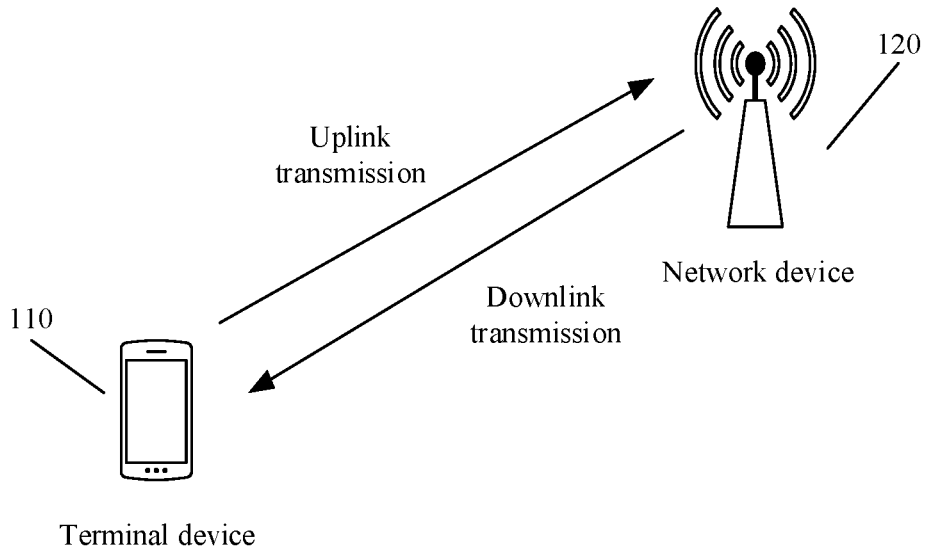
FIG. 3 is a schematic diagram of a system architecture according to an embodiment of this application.

FIG. 3 is a schematic diagram of a system architecture according to an embodiment of this application. As shown in FIG. 3, the network architecture includes a terminal device 110 and a network device 1200. The network device 1200 may be specifically a base station. The terminal device 110 may be specifically a mobile phone, a notebook computer, a tablet computer, a customer premises equipment (CPE), or the like. The network device 1200 provides a radio access service for the terminal device 110. Each network device 1200 corresponds to one service coverage area, and a terminal device 110 that enters the area may communicate with the network device 1200 by using a radio signal. In a process of receiving information sent by the network device 1200, the terminal device 110 may adjust a receive beam based on a posture change of the terminal device 110, to ensure that the terminal device 110 can correctly receive, without interruption, the information sent by the network device 1200. Based on the system architecture provided in this embodiment of this application, the network device 1200 may perform downlink transmission with the terminal device 110. For example, the network device 1200 sends a synchronization signal sequence to the terminal device 110. In addition, the terminal device 110 may perform uplink transmission with the network device 1200. The transmission herein may be specifically data transmission and physical layer control signaling transmission.

The following describes in detail the method and the related apparatus in various embodiments in accordance with the present disclosure with reference to the accompanying drawings. It should be noted that a presentation sequence of various embodiments in accordance with the present disclosure represents only a sequence of the embodiments, and does not represent priorities of the technical solutions provided in the embodiments.

Figure 4:
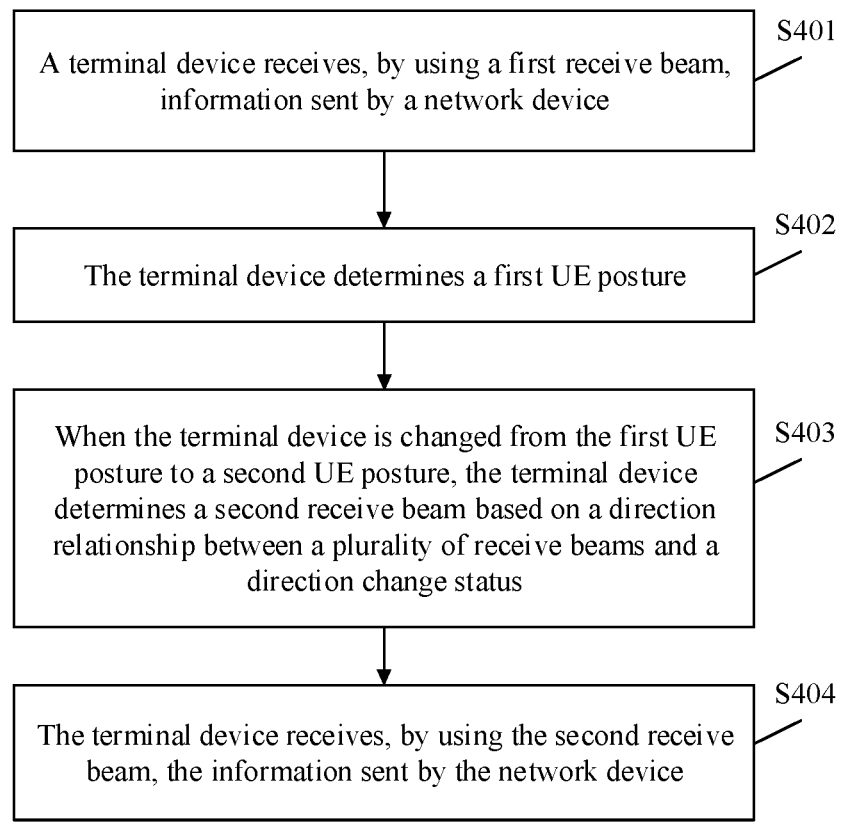
FIG. 4 is a schematic flowchart of a beam management method according to an embodiment of this application.

FIG. 4 is a schematic flowchart of a beam management method according to an embodiment of this application. A terminal device and a network device described in FIG. 4 may respectively correspond to the terminal device 110 and the network device 12000 shown in FIG. 3. As shown in FIG. 4, the method includes but is not limited to the following steps.

S401. The terminal device receives, by using a first receive beam, information sent by the network device.

For example, the terminal device has a plurality of receive beams, and selects one of the plurality of receive beams for receiving in a process of receiving the information sent by the network device.

For example, the terminal device may receive, in a beam sweeping process, the information sent by the network device, or may receive, in a random access process, the information sent by the network device, or may receive, after establishing a radio resource control (RRC) connection with the network device, the information sent by the network device. The information sent by the network device is downlink information. The downlink information may be information periodically sent by the network device, or may be information semi-statically sent by the network device, or information dynamically aperiodically sent by the network device. This is not limited herein.

In one implementation, the information sent by the network device includes synchronization reference information, and the synchronization reference information includes a channel state information-reference signal and/or a synchronization sequence block reference signal.

For example, before initiating random access, the terminal device needs to sweep all or some of beams on a network device side and all or some of beams on a terminal device side, and then find a beam pair that reaches an access threshold or has optimal performance from measured beam pairs for random access. Therefore, to select the best beam pair, the terminal device needs to receive the synchronization reference information sent by the network device.

Further, the synchronization reference information sent by the network device may be a channel state information-reference signal (CSI-RS), a synchronization sequence block (SSB) reference signal, or another reference signal.

It should be noted that the network device sends the synchronization reference information by using different transmit beams, and the terminal device receives the synchronization reference information sent by using the plurality of transmit beams. For example, if the network device has eight different transmit beams to cover an entire cell, and the terminal device has 10 receive beams, each receive beam of the terminal device needs to receive synchronization reference information sent by using the eight transmit beams of the network device, and channel quality measurement needs to performed based on the received synchronization reference information sent by using the eight transmit beams, to obtain a channel quality measurement result for each transmit beam; and the terminal device may send the channel quality measurement result to the network device. In a beam sweeping process, measurement needs to be performed 80 times to sweep all beams on the entire network device side and terminal device side, and a beam pair with a best channel quality measurement result may be found based on the channel quality measurement result.

In one implementation, received power of the channel state information-reference signal or the synchronization sequence block reference signal received by using the first receive beam is greater than a first threshold.

For example, in a beam sweeping process, the terminal device measures the received power of the received channel state information-reference signal or synchronization sequence block reference signal. After measuring all the beams, the terminal device determines a receive beam corresponding to a maximum received power value of the channel state information-reference signal or the synchronization sequence block reference signal as the first receive beam. The first threshold may be set by the terminal device, or may be set by the network device. This is not limited herein.

In one implementation, in a process in which the terminal device receives, by using the first receive beam, the information sent by the network device, if the plurality of receive beams have a blocked receive beam, the first receive beam does not include the blocked receive beam.

For example, in the beam sweeping process, the terminal device detects an antenna location blocking status by using a specific absorption rate (SAR) sensor. If the terminal device detects that some receive beams are blocked, because the blocked receive beams cannot be used for random access and subsequent information transmission due to extremely poor performance of the blocked receive beams, the terminal device ignores these blocked receive beams, and no longer uses these blocked receive beams to receive the synchronization reference information sent by the network device.

It may be understood that, the terminal device detects the antenna location blocking status by using the SAR sensor and ignores the blocked receive beams, so that sweeping time can be effectively reduced and sweeping efficiency of the entire sweeping process can be effectively improved.

S402. The terminal device determines a first UE posture.

For example, in the beam sweeping process, the network device sends synchronization reference information (for example, an SSB reference signal) to the terminal device by using different beams in one sweeping cycle (for example, an SSB cycle). The terminal device receives the synchronization reference information by using a same receive beam in one cycle and measures reference signal received power (RSRP). In a next sweeping cycle, the terminal device receives the synchronization reference information by using another receive beam and measures RSRP. In addition, a sensor of the terminal device performs detection to obtain data information. The sensor may include an accelerometer, a gyroscope, a magnetometer, and the like. After the sensor obtains the data information, a sensor context module on a micro control unit (MCU) of the terminal device performs fusion algorithm processing on the data information, to obtain a terminal device posture through calculation.

It should be noted that the sensor of the terminal device obtains the data information without interruption, and therefore terminal device postures at a plurality of moments may be obtained through calculation. For example, a terminal device posture in each sweeping cycle may be obtained. The terminal device determines a terminal device posture corresponding to a maximum RSRP value as the first UE posture based on RSRP values obtained through measurement.

In one implementation, the determining a first UE posture of the terminal device includes: in the process in which the terminal device receives, by using the first receive beam, the information sent by the network device, the terminal device obtains a UE posture parameter n times, calculates an average of UE posture parameters obtained n times, and determines a UE posture corresponding to the average as the first UE posture, where n is a positive integer greater than or equal to 1.

For example, in a process in which the terminal device receives, by using a same receive beam, the information sent by the network device, the sensor of the terminal device obtains data information a plurality of times, for example, obtains the UE posture parameter n times; and the sensor context module on the MCU of the terminal device calculates the average of the UE posture parameters obtained n times, and determines the posture corresponding to the average as the first UE posture, where n is a positive integer greater than or equal to 1.

Figure 5:
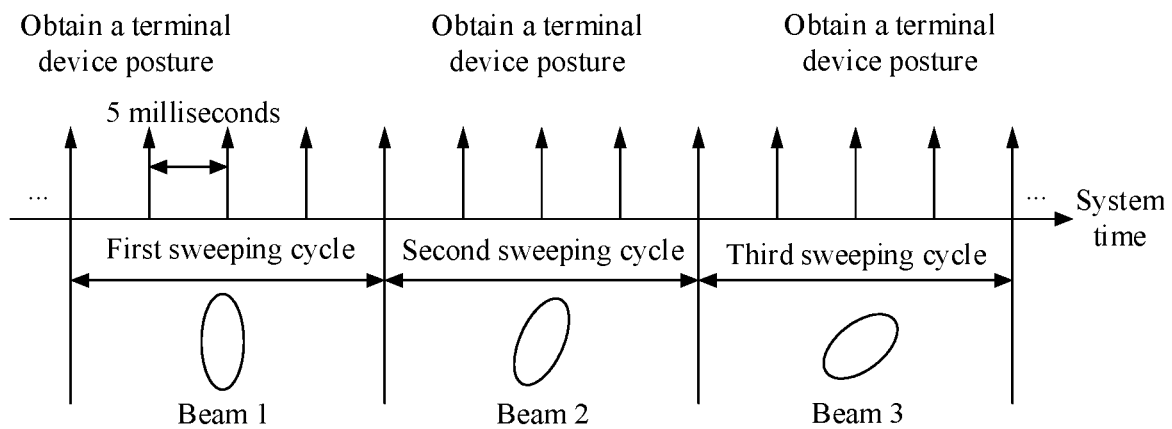
FIG. 5 is a schematic diagram of determining a UE posture in a beam sweeping process according to an embodiment of this application.

Further, in the beam sweeping process, all the beams on the network device side and one beam on the terminal device side are measured every 20 milliseconds according to a default configuration of a communications protocol. In other words, one sweeping cycle is 20 milliseconds. In one sweeping cycle, the sensor context on the MCU of the terminal device obtains a plurality of terminal device postures trough calculation based on UE posture parameters obtained by the sensor a plurality of times, calculates an average of parameters of the plurality of terminal device postures, and determines a UE posture corresponding to the average as the first UE posture. FIG. 5 is a schematic diagram of determining a UE posture in a beam sweeping process. As shown in FIG. 5, in the first sweeping cycle (namely, 20 milliseconds), a sensor context on an MCU of a terminal device obtains four terminal device postures through a plurality of times of calculation; in other words, obtains one terminal device posture every five milliseconds; and the terminal device calculates an average of parameters of the four obtained terminal device postures, and determines a posture corresponding to the average as a posture corresponding to the terminal device when the terminal device uses a beam 1 for sweeping. In the second sweeping cycle or the third sweeping cycle, the sensor context on the MCU of the terminal device still obtains one terminal device posture every five milliseconds through calculation; and the terminal device calculates an average of parameters of four obtained postures, and determines a posture corresponding to the average as a posture corresponding to the terminal device when the terminal device uses a beam 2 or a beam 3 for sweeping.

It may be understood that the terminal device obtains the terminal device posture a plurality of times in one sweeping cycle, calculates an average of parameters of a plurality of obtained terminal device postures, and uses a posture corresponding to the average as a posture during current beam sweeping, so that a finally determined terminal device posture can be more accurate.

S403. When the terminal device is changed from the first UE posture to a second UE posture, the terminal device determines a second receive beam based on at least a direction relationship between the plurality of receive beams and a direction change status.

For example, to ensure that the terminal device can receive the information sent by the network device, the plurality of receive beams of the terminal device need to cover an entire spherical space location, and a relative location between the plurality of receive beams does not change as a terminal device posture or location changes.

Figure 6:
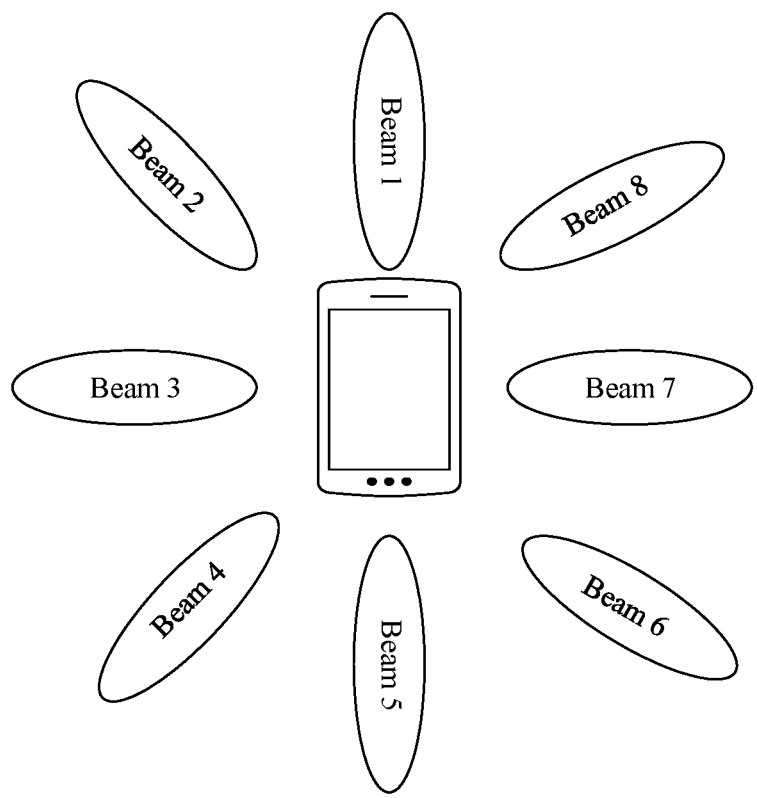
FIG. 6 is a schematic diagram of receive beams of a terminal device according to an embodiment of this application.

FIG. 6 is a schematic diagram of receive beams of a terminal device. As shown in FIG. 6, the terminal device has eight receive beams, and the eight receive beams cover an entire spherical space location, so that it can be ensured that the terminal device receives information from all directions. In addition, a location between the receive beams is fixed, for example, a location between a receive beam 1 and a receive beam 2 is fixed, and a location between a receive beam 7 and a receive beam 8 is also fixed.

Further, if the terminal device posture is changed, the terminal device obtains data information by using the sensor, calculates the direction change status of the terminal device (for example, the direction change status may be an angle change; for instance, a clockwise or counterclockwise rotation degree of a terminal device posture existing after the change relative to the terminal device posture existing before the change), and may determine, based on the direction change status and a relative location relationship between the plurality of receive beams, a receive beam that can meet a receiving condition (namely, a receive beam aligned with a transmit beam of the network device to a better degree) after the terminal device posture is changed. The terminal device determines the receive beam as the second receive beam, adjusts the receive beam to the second receive beam, and receives, by using the second receive beam, the information sent by the network device.

Figure 7:
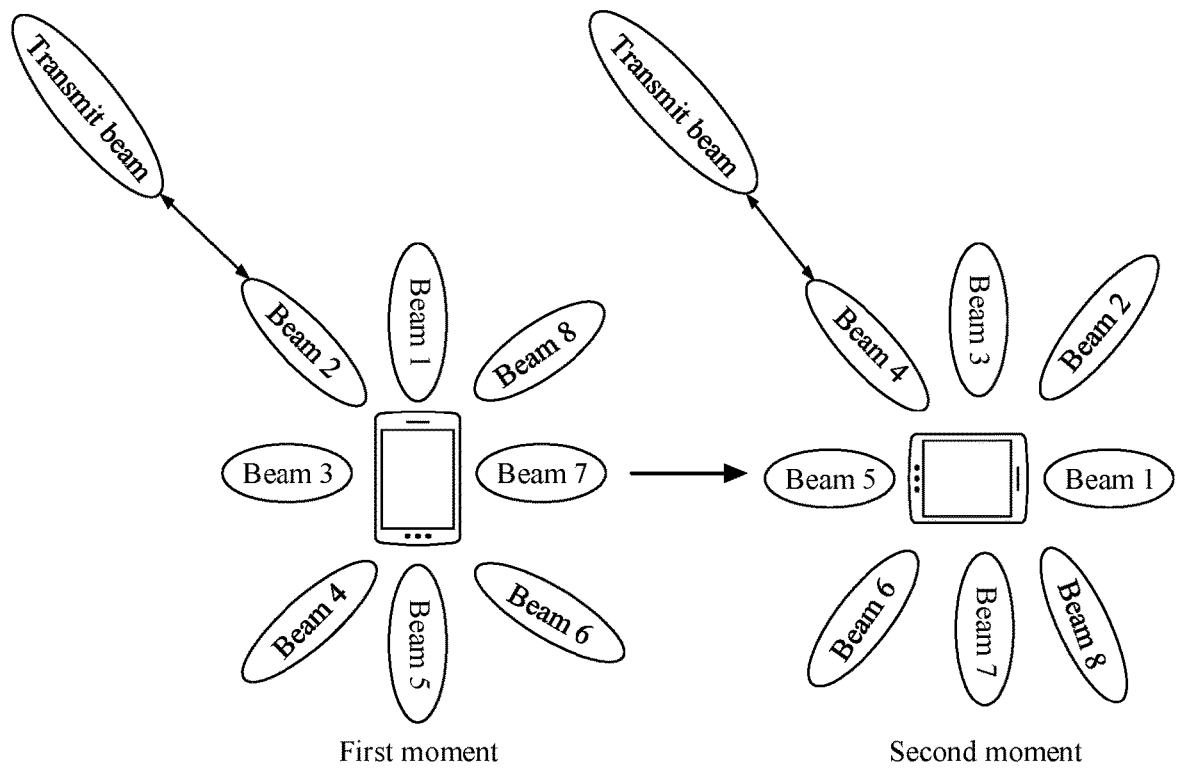
FIG. 7 is a schematic diagram of adjusting a receive beam when a terminal device posture is changed according to an embodiment of this application.

FIG. 7 is a schematic diagram of adjusting a receive beam when a terminal device posture is changed. As shown in FIG. 7, at a first moment, when a terminal device is in a first UE posture, a receive beam 2 of the terminal device is aligned with a transmit beam on a network device side to a best degree. In this case, the terminal device receives, by using the receive beam 2, information sent by a network device. At a second moment, when a posture of the terminal device is changed from the first UE posture to a second UE posture, a receive beam 4 of the terminal device is aligned with the transmit beam on the network device side to a best degree. In this case, the terminal device receives, by using the receive beam 4, the information sent by the network device.

Figure 8:
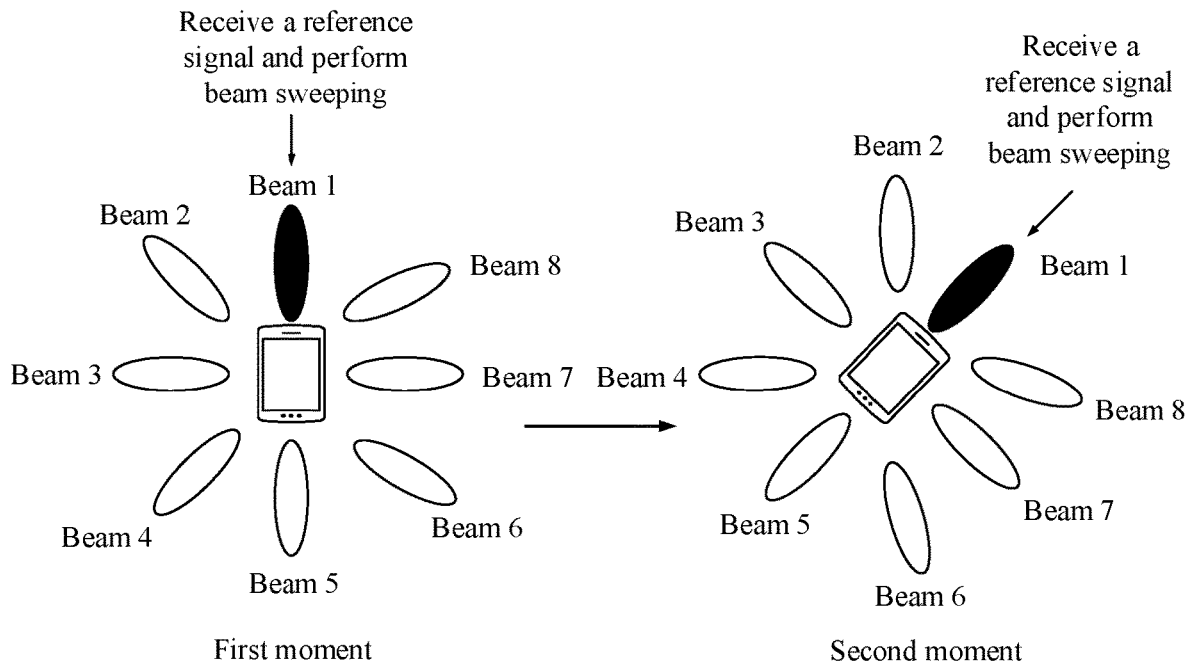
FIG. 8 is a schematic diagram of selecting a receive beam in a sweeping process according to an embodiment of this application.

It should be noted that in the beam sweeping process, spherical space locations need to be swept as many as possible and as quickly as possible, to find a beam pair that meets a condition (to be specific, has a best alignment degree). Each time one receive beam of the terminal device is swept, data information needs to be obtained by using the sensor, and a posture change of the terminal device is identified through calculation, to determine a receive beam of the terminal device that is to be used in a next sweeping cycle. FIG. 8 is a schematic diagram of selecting a receive beam in a sweeping process. As shown in FIG. 8, at a first moment, a terminal device receives, in this posture by using a receive beam 1, synchronization reference information sent by a network device, to complete a sweeping process. After the receive beam 1 is swept, the terminal device detects that the posture is changed and the terminal device is rotated to a new posture. In the new posture, a receive beam 2 corresponds to same sweeping coverage physical space as the receive beam 1 at the first moment, and if the terminal device receives, at a second moment by using the receive beam 2, the synchronization reference information sent by the network device, to complete a sweeping process, the two times of sweeping have a same result. Therefore, the terminal device uses another receive beam (a receive beam other than the receive beam 2) at the second moment based on the identified posture change, to complete the sweeping process. For example, the terminal device may continue to receive, by using the receive beam 1 at the second moment, the synchronization reference information sent by the network device, because after the posture of the terminal device is changed, sweeping coverage physical space corresponding to the receive beam 1 at the second moment is different form sweeping coverage physical space corresponding to the receive beam 1 at the first moment.

It may be understood that the terminal device may select a receive beam based on a posture change to complete a sweeping process, so that it can be ensured that better physical space coverage can be achieved in shorter time and repeated sweeping is avoided, thereby reducing sweeping time and improving sweeping efficiency.

In one implementation, when the terminal device is changed from the first UE posture to the second UE posture, if the plurality of receive beams have a blocked receive beam, the second receive beam does not include the blocked receive beam.

For example, when the posture of the terminal device is changed, the terminal device detects an antenna location blocking status by using the SAR sensor. If the terminal device detects that some receive beams are blocked, because the blocked receive beams cannot be used for random access and subsequent information transmission due to extremely poor performance of the blocked receive beams, the terminal device ignores these blocked receive beams, and selects, after the posture change, an unblocked receive beam to receive the information sent by the network device.

It may be understood that the terminal device detects the antenna location blocking status by using the SAR sensor and ignores the blocked receive beams, so that it can be ensured that the terminal device can still accurately receive, after the posture change, the information sent by the network device, thereby ensuring good access performance.

In one implementation, in a random access process, if the second UE posture is a posture corresponding to the terminal device when the terminal device sends a random access preamble, before the terminal device receives, by using the second receive beam, the information sent by the network device, the method further includes: the terminal device sends the random access preamble by using the second receive beam.

For example, total beam sweeping time is direct proportional to a receive beam supported on the terminal device side. If all the transmit beams on the network device side and one receive beam on the terminal device side are measured in 20 milliseconds, total time required for measuring all the beams is N*20 milliseconds, where N is a quantity of receive beams supported on the terminal device side. If a beam pair obtained through measurement in the first sweeping cycle meets a random access condition (for example, received power of a received SSB reference signal is greater than a first threshold), a shortest latency from measurement to initiation of random access by the terminal device needs to be about 120 milliseconds. If the terminal device posture is changed in this process (namely, in 120 milliseconds), but the terminal device still initiates random access by using a beam obtained through measurement, the random access may fail or performance may be poor after the random access.

Further, after beam sweeping, the terminal device has determined a beam pair that meets a condition. If random access needs to be initiated at a random access moment, in this case, the terminal device obtains data information by using the sensor, calculates a posture change status of the terminal device, and determines a posture (namely, the second UE posture) at a current moment, where the posture is different from a posture (namely, the first UE posture) of the terminal device at a sweeping moment. The terminal device adjusts a receive beam based on the posture change and the location relationship between the receive beams; to be specific, adjusts the receive beam from the first receive beam determined at the sweeping moment to the second receive beam obtained after the posture change.

It should be noted that at the random access moment, the terminal device initiates the random process by using a physical random access channel (PRACH) resource associated with the synchronization reference information (for example, an SSB reference signal). The terminal device sends the random access preamble (preamble) to the network device by using the second receive beam obtained after the adjustment, and starts a timer to wait for a random access response (RAR) message from the network device side. The timer may be configured by using RRC signaling.

Figure 9A:
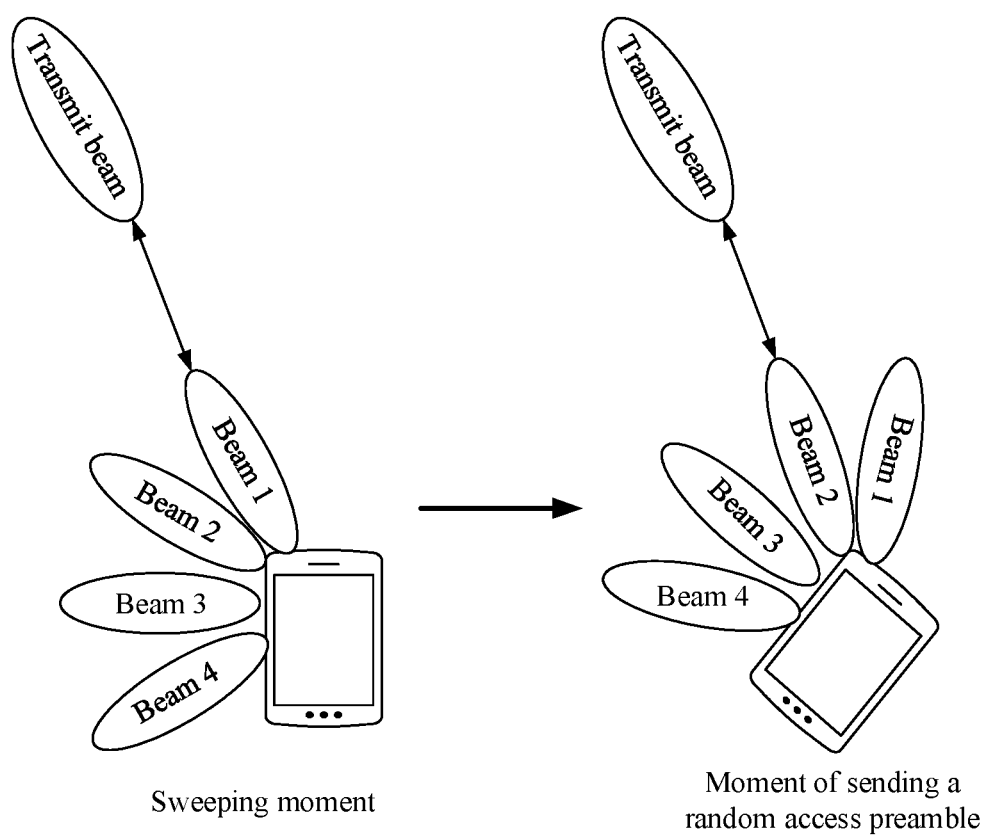
FIG. 9A is a schematic diagram of selecting a receive beam in a random access process according to an embodiment of this application.

FIG. 9A is a schematic diagram of selecting a receive beam in a random access process. As shown in FIG. 9A, after beam sweeping, a terminal device is in a first UE posture. In this case, a receive beam 1 is aligned with a transmit beam of a network device to a best degree. At a moment at which the terminal device sends a preamble, a terminal device posture is changed. In this case, the terminal device is in a second UE posture, the receive beam 1 is deviated from the transmit beam of the network device, and a receive beam 2 is aligned with the transmit beam of the network device to a better degree. The terminal device selects the receive beam 2 to send the random access preamble to the network device.

It may be understood that, in the random access process, the receive beam is adjusted based on the posture change of the terminal device, thereby increasing a random access success rate.

In one implementation, in a random access process, if the second UE posture is a posture corresponding to the terminal device when the terminal device receives a random access response sent by the network device, that the terminal device receives, by using the second receive beam, the information sent by the network device includes: the terminal device receives, by using the second receive beam, the random access response sent by the network device.

For example, after the terminal device sends a preamble to the network device, the network device selects a proper beam based on a status of a resource allocated to the terminal device to initiate random access, to receive the preamble sent by the terminal device, and sends an RAR message to the terminal device.

In particular, in a process in which the terminal device waits for the network device to send the RAR message, the terminal device posture is changed, and consequently a posture (namely, the second UE posture) at a current moment is different from a posture at a moment of sending the preamble. In this case, the terminal device adjusts the receive beam based on the posture change and the location relationship between the receive beams; to be specific, determines a receive beam (namely, the second receive beam) aligned with a transmit beam of the network device to a best degree in the posture at the current moment, and receives, by using the receive beam, the RAR message sent by the network device.

Figure 9B:
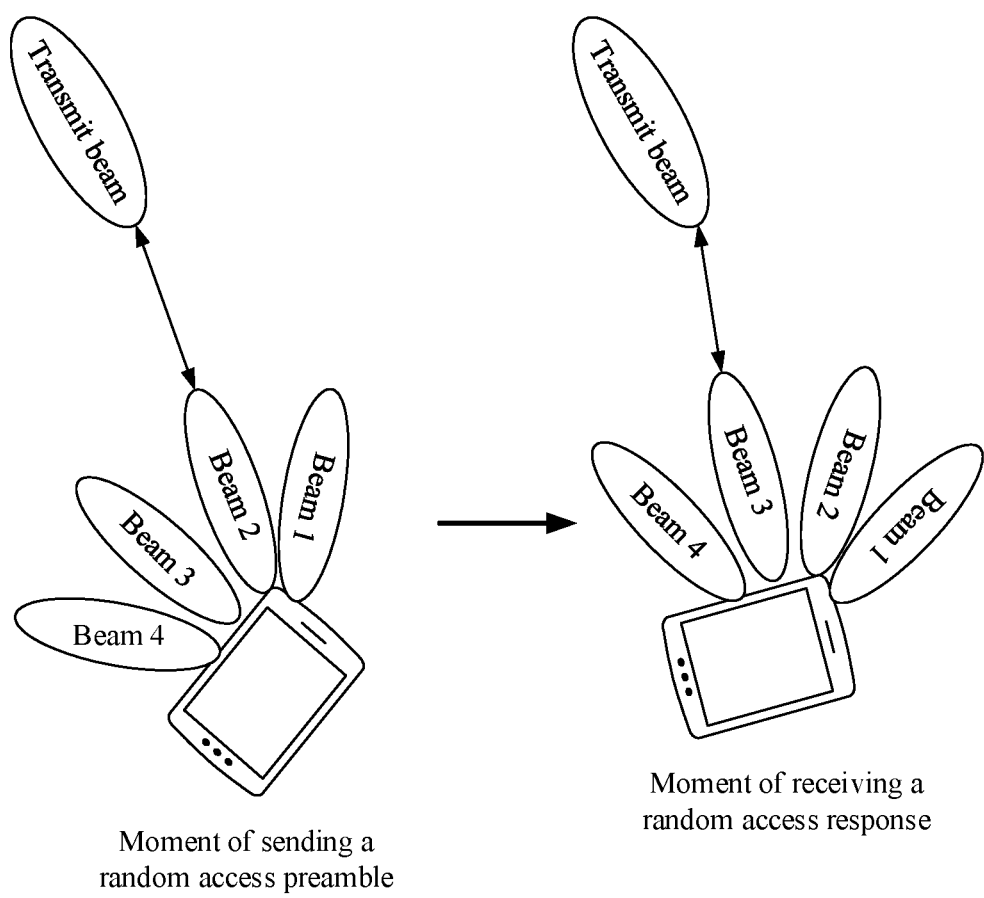
FIG. 9B is a schematic diagram of selecting a receive beam in another random access process according to an embodiment of this application.

FIG. 9B is a schematic diagram of selecting a receive beam in another random access process. As shown in FIG. 9B, when a terminal device sends a preamble, a receive beam 2 is aligned with a transmit beam of a network device to a best degree. In a process in which the terminal device waits, after sending the preamble, for the network device to send an RAR message, a terminal device posture is changed. In this case, the receive beam 2 is deviated from the transmit beam of the network device, and a receive beam 3 is aligned with the transmit beam of the network device to a better degree. The terminal device selects the receive beam 3 to receive the RAR message sent by the network device.

It may be understood that, in the random access process, the receive beam is adjusted based on the posture change of the terminal device, thereby increasing a random access success rate.

In one implementation, in a contention-based random access process, if the second UE posture is a posture corresponding to the terminal device when the terminal device receives a contention resolution response message sent by the network device, that the terminal device receives, by using the second receive beam, the information sent by the network device includes: the terminal device receives, by using the second receive beam, the contention resolution response message sent by the network device.

For example, in a non-contention-based random access process, the terminal device completes the entire random access process after receiving an RAR message sent by the network device. However, in the contention-based random access process, after receiving an RAR message sent by the network device, the terminal device needs to further send a random access request message (namely, Msg3) to the network device, and start a contention resolution timer to wait for the contention resolution response message from the network device. The timer may be configured by using RRC signaling.

In particular, in a process in which the terminal device waits for the network device to send the contention resolution response message, the terminal device posture is changed, and consequently a posture (namely, the second UE posture) at a current moment is different from a posture at a moment of sending the random access request message. In this case, the terminal device adjusts the receive beam based on the posture change and the location relationship between the receive beams; to be specific, determines a receive beam (namely, the second receive beam) aligned with the transmit beam of the network device to a best degree in the posture at the current moment, and receives, by using the receive beam, the contention resolution response message sent by the network device.

Figure 9C:
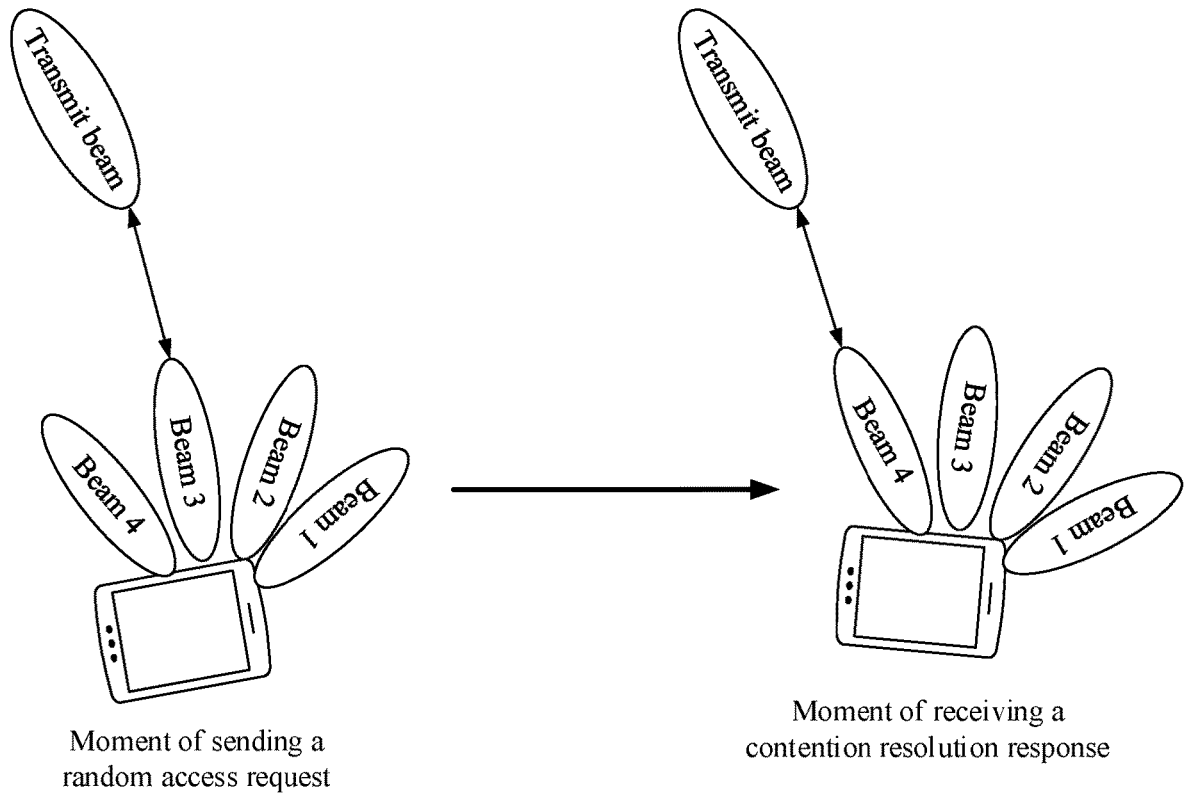
FIG. 9C is a schematic diagram of selecting a receive beam in another random access process according to an embodiment of this application.

FIG. 9C is a schematic diagram of selecting a receive beam in another random access process. As shown in FIG. 9C, when a terminal device sends a random access request message, a receive beam 3 is aligned with a transmit beam of a network device to a best degree. In a process in which the terminal device waits, after sending the random access request message, for the network device to send a contention resolution response message, a terminal device posture is changed. In this case, the receive beam 3 is deviated from the transmit beam of the network device, and a receive beam 4 is aligned with the transmit beam of the network device to a better degree. The terminal device selects the receive beam 4 to receive the contention resolution response message sent by the network device, and completes the entire random access process after receiving the contention resolution response message sent by the network device.

It may be learned that, in the contention-based random access process, the receive beam is adjusted based on the posture change of the terminal device, thereby increasing a random access success rate.

In one implementation, when the terminal device is in a connected discontinuous reception state or an idle discontinuous reception state, the first UE posture includes a posture corresponding to the terminal device before the terminal device enters sleep, and the second UE posture includes a posture corresponding to the terminal device when the terminal device wakes up.

For example, a discontinuous reception (DRX) characteristic may enable the terminal device to reduce power consumption without always being in a working and listening state. When the terminal device is in the connected discontinuous reception (CDRX) state, the terminal device wakes up regularly during each DRX cycle for a period of time to receive data, without always listening on a physical downlink control channel (PDCCH). The DRX cycle includes two types: a long cycle and a short cycle, and the long cycle is an integer multiple of the short cycle.

Further, the terminal device may adjust use of the long cycle or the short cycle as required. For example, if in a long cycle, the terminal device wakes up and finds that data arrives, in a subsequent period of time, the terminal device adjusts the long cycle to the short cycle. After a period of time, if no data arrives in several consecutive (for example, three) short cycles, the terminal device adjusts the short cycle to the long cycle to reduce power consumption.

Figure 10:
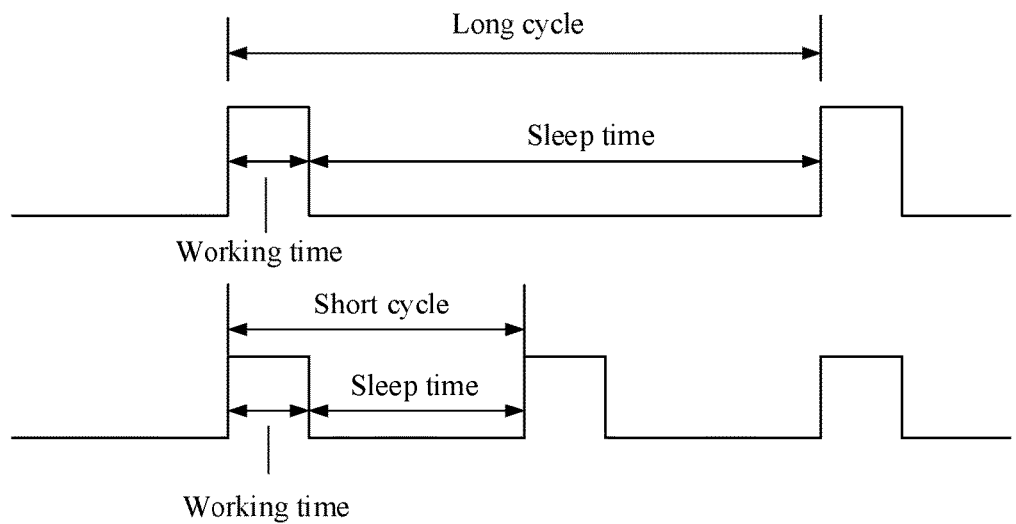
FIG. 10 is a schematic diagram of connected discontinuous reception according to an embodiment of this application.

FIG. 10 is a schematic diagram of connected discontinuous reception. As shown in FIG. 10, a long cycle is twice a short cycle. A period of working time exists in each cycle (long cycle or short cycle), and in this time period, the terminal device wakes up from a sleep state and monitors and receives data.

When the terminal device is in the idle discontinuous reception (IDRX) state, the terminal device has no dedicated radio resource, and only needs to wake up and listen on a paging channel and a broadcast channel in a fixed cycle (namely, a paging cycle length) specified by a network. If the terminal device receives a paging message or a system message from the paging channel or the broadcast channel and needs to further process the paging message or the system message, the terminal device needs to switch from the idle state to a connected state; to be specific, establish an RRC connection to receive data.

It should be noted that, a terminal device posture is changed in a sleep process of the terminal device, and consequently a posture (namely, the second UE posture) at a wakeup moment is different from a posture (namely, the first UE posture) recorded before the terminal device enters sleep. The terminal device adjusts the receive beam based on the posture change and the location relationship between the receive beams; to be specific, determines a receive beam (namely, the second receive beam) aligned with the transmit beam of the network device to a best degree in the posture at the wakeup moment, and receives, by using the receive beam, the data sent by the network device.

Figure 11:
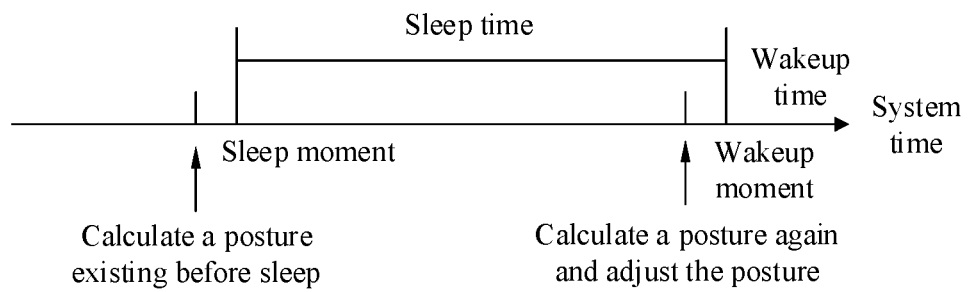
FIG. 11 is a schematic diagram of adjusting a receive beam when a terminal device is in a discontinuous reception state according to an embodiment of this application.

FIG. 11 is a schematic diagram of adjusting a receive beam when a terminal device is in a discontinuous reception state. As shown in FIG. 11, before entering sleep, the terminal device obtains data information by using a sensor, and obtains a terminal device posture through calculation. Before the terminal device wakes up from a sleep state, the terminal device obtains data information again by using the sensor and obtains a terminal device posture at this time through calculation. The terminal device adjusts the receive beam based on a change in the postures at the two moments, and selects a receive beam aligned with the transmit beam of the network device to a best degree in the latest posture of the terminal device, to ensure that when waking, the terminal device can receive, data by using the receive beam aligned with the network device to a best degree.

It may be understood that when the terminal device is in CDRX or IDRX state, the receive beam is adjusted based on a change in a posture existing before the terminal device enters sleep and a posture at a wakeup moment, so that it can be ensured that the terminal device can receive, at the wakeup moment by using a proper receive beam, the data sent by the network device, thereby ensuring that transmission between the terminal device and the network device is not interrupted.

In one implementation, after determining the first UE posture of the terminal device in the process in which the terminal device receives, by using the first receive beam, the information sent by the network device, the method further includes: in the process in which the terminal device receives, by using the first receive beam, the information sent by the network device, if received power of synchronization reference information received by the terminal device in a third UE posture is greater than received power of the synchronization reference information received by the terminal device in a fourth UE posture, the terminal device corrects parameter information corresponding to the first UE posture to parameter information corresponding to the third UE posture.

For example, each receive beam correspondingly covers specific physical space. When a posture change of the terminal device is relatively slight (for example, the terminal device is rotated by a relatively small angle), receive beam switching is not caused. If the terminal device keeps this slight change, receive beam switching is caused when a posture change of the terminal device exceeds a critical value.

Further, in a process in which a posture change of the terminal device does not cause receive beam switching, all postures correspond to a same receive beam. However, synchronization reference information received in all the postures has different received power. A terminal device posture corresponding to a maximum received power value is aligned with the network device to a best degree. The posture is used as a reference posture of the receive beam. If a posture of the terminal device is subsequently changed, a changed posture needs to be compared with the posture corresponding to the maximum received power value to obtain a posture change status and determine whether receive beam switching is to be caused.

For example, when the terminal device is in a connected state and is not in DRX, and a terminal device posture is not changed, a receive beam corresponding to the terminal device is a receive beam 0. When the terminal device posture is changed and the change is q1, receive beam switching is not sufficiently caused, and the receive beam corresponding to the terminal device is still the receive beam 0. When the terminal device posture continues to change and the change is q2, an angle change of a terminal device posture at this time relative to a posture at the beginning (no change occurs) needs to cause receive beam switching, and the terminal device switches the receive beam to a receive beam 2, and records a posture corresponding to the receive beam 2 as the posture at this time (namely, a terminal device posture obtained after the q2 change). In this case, the terminal device receives, by using the receive beam 2, synchronization reference information sent by the network device, and obtains received power of the synchronization reference information through measurement. When the terminal device posture continues to change and the change is q3, the receive beam corresponding to the terminal device is still the receive beam 2. In this case, the terminal device continues to receive, by using the receive beam 2, synchronization reference information sent by the network device, and obtains received power of the synchronization reference information through measurement. If the received power of the synchronization reference information received by using the receive beam 2 in a posture obtained after the q3 change is greater than the received power of the synchronization reference information received by using the receive beam 2 in the posture obtained after the q2 change, the terminal device adjusts parameter information of the posture corresponding to the receive beam 2, and re-records the parameter information of the posture corresponding to the receive beam 2 as a posture at a current moment (namely, parameter information of the terminal device posture obtained after the q3 change).

It may be understood that, in a process of obtaining data information by using the sensor, obtaining a terminal device posture at each moment through calculation, and adjusting a receive beam of the terminal device based on a posture change of the terminal device, synchronization reference information sent by the network device may be received, and parameter information corresponding to the terminal device posture is corrected by comparing values of received power of the synchronization reference information. Therefore, a cumulative error caused by continuous dependence on sensor detection can be eliminated, and receive beam switching can be more accurate. In addition, measurement frequency based on synchronization reference information can be reduced, and power consumption can be reduced.

In one implementation, when the plurality of receive beams are formed by using a single-polarized antenna, the method further includes: if a rotation angle between the first UE posture and the second UE posture is less than a second threshold, a polarization direction of the second receive beam is the same as a polarization direction of the first receive beam; or if a rotation angle between the first UE posture and the second UE posture is greater than a first threshold, a polarization direction of the second receive beam is different from a polarization direction of the first receive beam.

For example, polarization isolation is relatively high in a high frequency scenario. When the receive beams of the terminal device are formed by using the single-polarized (horizontally polarized or vertically polarized) antenna, if the terminal device needs to correctly receive the information sent by the network device, both a degree of alignment between a beam direction of a receive beam of the terminal device and a beam direction of a transmit beam of the network device and a degree of alignment between a polarization direction of generating the receive beam and a polarization direction of generating the transmit beam need to be better.

Figure 12:
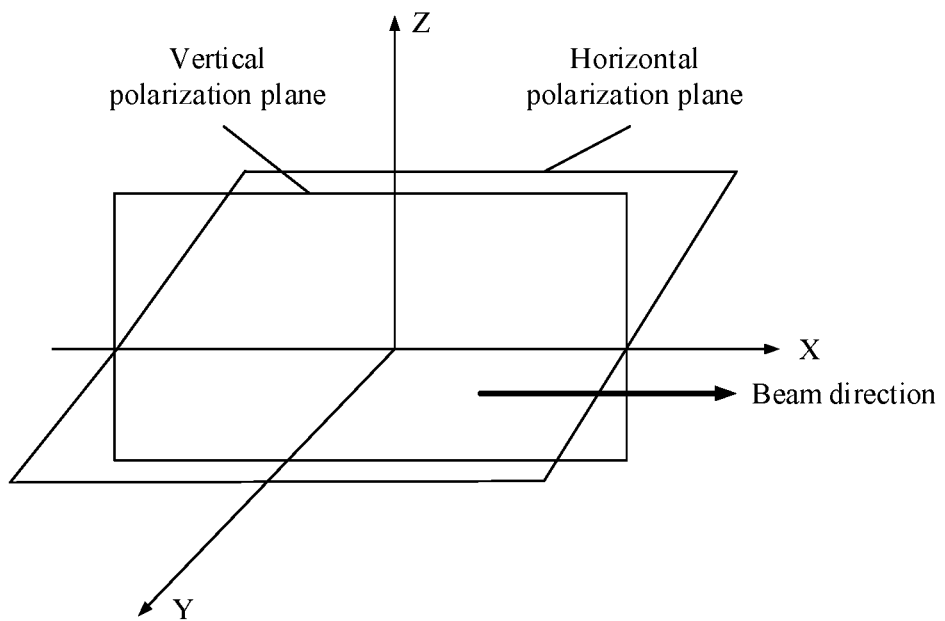
FIG. 12 is a schematic diagram of generating a beam by using a dual-polarized antenna according to an embodiment of this application.

FIG. 12 is a schematic diagram of generating a beam by using a dual-polarized antenna. As shown in FIG. 12, horizontal polarization and vertical polarization exist. A horizontal polarization plane is in an XY plane, and a vertical polarization plane is in an XZ plane. However, a beam direction of a beam formed through horizontal polarization is consistent with a beam direction of a beam formed through vertical polarization, and is the same as a direction of a positive half-axis of an X-axis. In addition, performance of receiving and transmitting information and data between the terminal device and the network device is related to a degree of alignment between a polarization direction of a transmit beam and a polarization direction of a receive beam.

In particular, when a transmit beam of the network device is formed by using a dual-polarized antenna, a receive beam of the terminal device is formed by using a horizontally or vertically polarized antenna. Alternatively, when a transmit beam of the network device is formed by using a horizontally polarized antenna, a receive beam of the terminal device is also formed by using a horizontally polarized antenna. Alternatively, when a transmit beam of the network device is formed by using a vertically polarized antenna, a receive beam of the terminal device is also formed by using a vertically polarized antenna. In the foregoing case, if a terminal device posture is changed, the sensor of the terminal device obtains data information, and calculates the posture change and a rotation angle change of the terminal device. If the rotation angle is less than the second threshold, and the second threshold may be preset by the network device or the terminal device, for example, may be 45 degrees, it indicates that a polarization direction of a receive beam (namely, the second receive beam) obtained after the posture change is the same as a polarization direction of a receive beam (namely, the first receive beam) existing before the posture change. The terminal device adjusts the receive beam to the second receive beam based on the posture change and the location relationship between the receive beams, and the second receive beam and the first receive beam have a same beam direction and a same polarization direction. For example, if the first receive beam is formed through horizontal polarization, the second receive beam is also formed through horizontal polarization; or if the first receive beam is formed through vertical polarization, the second receive beam is also formed through vertical polarization.

If the rotation angle is greater than 45 degrees, it indicates that a polarization direction of a receive beam (namely, the second receive beam) obtained after the posture change is different from a polarization direction of a receive beam (namely, the first receive beam) existing before the posture change. The terminal device adjusts the receive beam to the second receive beam based on the posture change and the location relationship between the receive beams, and the second receive beam and the first receive beam have a same beam direction and different polarization directions. For example, if the first receive beam is formed through horizontal polarization, the second receive beam is formed through vertical polarization; or if the first receive beam is formed through vertical polarization, the second receive beam is formed through horizontal polarization.

It may be understood that, the posture change and the rotation angle change of the terminal device are obtained by using the sensor, so that it can be ensured that the terminal device can select a receive beam in a correct polarization direction after the posture is changed, thereby ensuring performance of transmission between the terminal device and the network device.

S404. The terminal device receives, by using the second receive beam, the information sent by the network device.

Specifically, if the terminal device posture is changed in the beam sweeping process, the terminal device may receive, by using the second receive beam, the synchronization reference information sent by the network device. Alternatively, if the terminal device posture is changed in the random access process, the terminal device may receive, by using the second receive beam, the RAR response message or the contention resolution response message sent by the network device. Alternatively, if the terminal device posture is changed in a process in which the terminal device establishes an RRC connection to the network device, the terminal device may receive, by using the second receive beam, service information or data sent by the network device.

To better implement the foregoing solutions in various embodiments in accordance with the present disclosure, the following correspondingly further provides related apparatuses configured to implement the foregoing solutions through cooperation.

Figure 13:
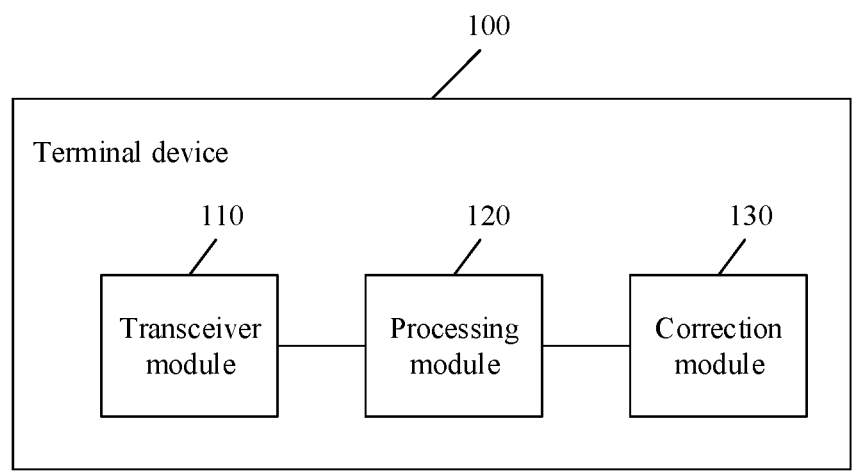
FIG. 13 is a schematic structural diagram of a terminal device according to an embodiment of this application.

FIG. 13 is a schematic structural diagram of a terminal device according to an embodiment of this application. The terminal device 100 includes at least a transceiver module 110 and a processing module 120.

The transceiver module 110 is configured to receive information sent by a network device.

The processing module 120 is configured to determine a first UE posture of the terminal device in a process in which the transceiver module 110 receives, by using a first receive beam, the information sent by the network device, where the terminal device includes a plurality of receive beams.

The processing module 120 is further configured to: when the terminal device is changed from the first UE posture to a second UE posture, determine a second receive beam based on a direction relationship between the plurality of receive beams and a direction change status of the terminal device when changing from the first UE posture to the second UE posture.

The transceiver module 110 is further configured to receive, by using the second receive beam, the information sent by the network device.

In this embodiment of this application, when a posture is changed, the terminal device may determine, based on the direction relationship between the plurality of receive beams and the direction change status of the UE posture, the second receive beam obtained after the posture change, so that a quantity of times of repeated physical space sweeping can be reduced, sweeping efficiency can be improved, and a random access success rate can be increased. In addition, measurement frequency based on a reference signal can be reduced, power consumption can be reduced, and link robustness can be improved.

In an embodiment, the information that is sent by the network device and that is received by the transceiver module 110 includes synchronization reference information, and the synchronization reference information includes a channel state information-reference signal and/or a synchronization sequence block reference signal.

In an embodiment, received power of the channel state information-reference signal or the synchronization sequence block reference signal received by the transceiver module 110 by using the first receive beam is greater than a first threshold.

In an embodiment, in the process in which the transceiver module 110 receives, by using the first receive beam, the information sent by the network device, if the plurality of receive beams have a blocked receive beam, the first receive beam does not include the blocked receive beam.

In an embodiment, when the terminal device is changed from the first UE posture to the second UE posture, if the plurality of receive beams have a blocked receive beam, the second receive beam does not include the blocked receive beam.

In an embodiment, the processing module 120 is further configured to: in the process in which the transceiver module receives, by using the first receive beam, the information sent by the network device, obtain a UE posture parameter n times, calculate an average of UE posture parameters obtained n times, and determine a posture corresponding to the average as the first UE posture, where n is a positive integer greater than or equal to 1.

In an embodiment, if the second UE posture is a posture corresponding to the terminal device when the terminal device sends a random access preamble, before the transceiver module 110 receives, by using the second receive beam, the information sent by the network device, the transceiver module 110 is further configured to send the random access preamble by using the second receive beam.

In an embodiment, if the second UE posture is a posture corresponding to the terminal device when the terminal device receives a random access response sent by the network device, the transceiver module 110 is further configured to receive, by using the second receive beam, the random access response sent by the network device.

In an embodiment, in a contention-based random access process, if the second UE posture is a posture corresponding to the terminal device when the terminal device receives a contention resolution response message sent by the network device, the transceiver module 110 is further configured to receive, by using the second receive beam, the contention resolution response message sent by the network device.

In an embodiment, when the terminal device is in a connected discontinuous reception state or an idle discontinuous reception state, the first UE posture includes a posture corresponding to the terminal device before the terminal device enters sleep, and the second UE posture includes a posture corresponding to the terminal device when the terminal device wakes up.

In an embodiment, the terminal device further includes a correction module 130, configured to: in the process in which the transceiver module 110 receives, by using the first receive beam, the information sent by the network device, if received power of synchronization reference information received by the terminal device in a third UE posture is greater than received power of the synchronization reference information received by the terminal device in a fourth UE posture, correct the first UE posture to the third UE posture.

In an embodiment, when the plurality of receive beams are formed by using a single-polarized antenna, if a rotation angle between the first UE posture and the second UE posture is less than a second threshold, a polarization direction of the second receive beam is the same as a polarization direction of the first receive beam; or if a rotation angle between the first UE posture and the second UE posture is greater than a first threshold, a polarization direction of the second receive beam is different from a polarization direction of the first receive beam.

It may be understood that in this embodiment of this application, the transceiver module 110 may be implemented by a transceiver or a transceiver-related circuit component, the processing module 120 may be implemented by a processor or a processor-related circuit component, and the correction module 130 may be implemented by a corrector or a corrector-related circuit component. The terminal device may perform the steps performed by the terminal device in the beam management method shown in FIG. 4. Details are not described herein again. For details, refer to FIG. 4 and related content.

Figure 14:
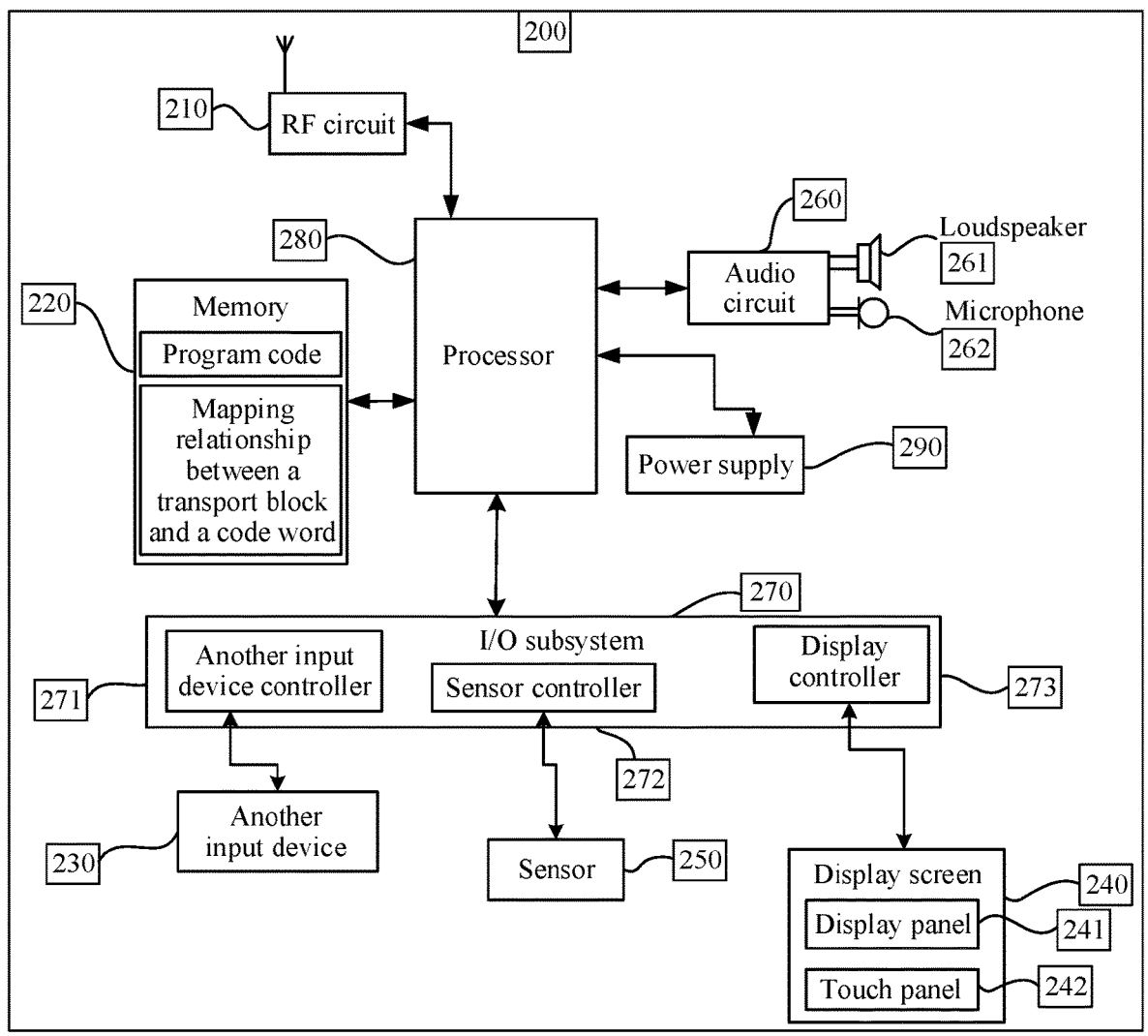
FIG. 14 is a schematic structural diagram of another terminal device according to an embodiment of this application.

FIG. 14 is a schematic structural diagram of another terminal device according to an embodiment of this application. The terminal device in this implementation includes a mobile phone, a tablet computer, a vehicle-mounted computer, and the like.

For example, the terminal is a mobile phone. FIG. 14 is a block diagram of a partial structure of a mobile phone 200 related to this embodiment of this application. Referring to FIG. 14, the mobile phone 200 includes components such as a radio frequency (radio frequency, RF) circuit 210, a memory 220, another input device 230, a display screen 240, a sensor 250, an audio circuit 260, an I/O subsystem 270, a processor 280, and a power supply 290. A person skilled in the art may understand that the structure of the mobile phone shown in FIG. 14 constitutes no limitation on the mobile phone, and the mobile phone may include more or fewer components than those shown in the figure, or may combine some components, or may split some components, or may have a different component arrangement. A person skilled in the art may understand that the display screen 240 belongs to a user interface (user interface, UI), and the mobile phone 200 may include more or fewer user interfaces than those shown in the figure.

The following describes the components of the mobile phone 200 in detail with reference to FIG. 14.

The RF circuit 210 may be configured to receive and send a signal in an information receiving and sending process or in a call process. In particularly, the RF circuit 210 may be configured to: after receiving downlink information from a base station, send the downlink information to the processor 280 for processing; and send uplink data to the base station. Generally, the RF circuit includes but is not limited to an antenna, at least one amplifier, a transceiver, a coupler, a low noise amplifier (low noise amplifier, LNA), a duplexer, and the like. In addition, the RF circuit 210 may further communicate with a network and another device through wireless communication. The wireless communication may use any communications standard or protocol, including but not limited to global system for mobile communications (GSM), general packet radio service (GPRS), code division multiple access (CDMA), wideband code division multiple access (WCDMA), long term evolution (LTE), an email, a short message service (SMS), and the like. In this embodiment of this application, the RF circuit 210 may be configured to receive a channel state information-reference signal or a synchronization sequence block reference signal, a random access response, or a contention resolution response message. In addition, the RF circuit 210 may be further configured to send a random access preamble.

The memory 220 may be configured to store a software program and a module. The processor 280 performs various function applications of the mobile phone 200 and data processing by running the software program and the module that are stored in the memory 220. The memory 220 may mainly include a program storage area and a data storage area. The program storage area may store an operating system, an application program required by at least one function (such as a sound playing function or an image playing function), and the like. The data storage area may store data (such as audio data or an address book) created based on use of the mobile phone 200, and the like. In addition, the memory 220 may include a high-speed random access memory, and may further include a nonvolatile memory, for example, at least one magnetic disk storage device, a flash storage device, or another volatile solid-state storage device. In a specific embodiment of this application, the memory 220 may store parameter change information of a UE posture.

The another input device 230 may be configured to receive entered digital or character information; and generate key signal input related to user settings and function control of the mobile phone 200. For example, the another input device 230 may include but is not limited to one or more of a physical keyboard, a function key (such as a volume control key or an on/off key), a trackball, a mouse, a joystick, and an optical mouse (the optical mouse is a touch-sensitive surface that does not display visual output, or an extension of a touch-sensitive surface formed by a touchscreen). Input device 230 is connected to another input device controller 271 in the I/O subsystem 270, and exchanges a signal with the processor 280 under control of the another input device controller 271.

The display screen 240 may be configured to display information entered by a user or information provided for the user and various menus of the mobile phone 200, and may further receive user input. Specifically, the display screen 240 may include a display panel 241 and a touch panel 242. The display panel 241 may be configured in a form, such as a liquid crystal display (LCD) or an organic light-emitting diode (OLED). The touch panel 242 is also referred to as a touchscreen, a touch-sensitive screen, or the like, and may collect a touch or non-touch operation (for example, an operation performed by the user on the touch panel 242 or near the touch panel 242 by using any proper object or accessory, such as a finger or a stylus, where the touch or non-touch operation may also include a somatosensory operation, and the operation includes an operation type such as a single-point control operation or a multipoint control operation) performed by the user on or near the touch panel 242, and drive a corresponding connection apparatus based on a preset program. In some embodiments, the touch panel 242 may include two parts: a touch detection apparatus and a touch controller. The touch detection apparatus detects a touch direction and posture of the user, detects a signal brought by a touch operation, and transmits the signal to the touch controller. The touch controller receives touch information from the touch detection apparatus, converts the touch information into information that can be processed by the processor, and then sends the information to the processor 280; and can receive and execute a command sent by the processor 280. In addition, the touch panel 242 may be implemented by using a plurality of types such as a resistive type, a capacitive type, an infrared ray, and a surface acoustic wave, or the touch panel 242 may be implemented by using any technology developed in the future. Further, the touch panel 242 may cover the display panel 241. The user may perform, based on content displayed on the display panel 241 (the displayed content includes but is not limited to a soft keyboard, a virtual mouse, a virtual key, an icon, and the like), an operation on or near the touch panel 242 that covers the display panel 241. After detecting the operation on or near the touch panel 242, the touch panel 242 transmits the operation to the processor 280 by using the I/O subsystem 270, to determine user input. Then, the processor 280 provides corresponding visual output on the display panel 241 based on the user input by using the I/O subsystem 270. Although the touch panel 242 and the display panel 241 in FIG. 14 are used as two separate parts to implement input and output functions of the mobile phone 200, in some embodiments, the touch panel 242 and the display panel 241 may be integrated to implement the input and output functions of the mobile phone 200.

The mobile phone 200 may further include at least one type of sensor 250, such as a light sensor, a motion sensor, a specific absorption rate (specific absorption rate, SAR) sensor, and another sensor. Specifically, the light sensor may include an ambient light sensor and a proximity sensor. The ambient light sensor may adjust luminance of the display panel 241 based on brightness of ambient light. The proximity sensor may power off the display panel 241 and/or backlight when the mobile phone 200 moves to an ear. As one type of motion sensor, an accelerometer sensor may detect values of accelerations in all directions (generally on three axes), may detect a value and a direction of gravity when the mobile phone 200 is stationary, and may be applied to an application that recognizes a mobile phone posture (for example, screen switching between landscape and portrait modes, a related game, or magnetometer posture calibration), a function related to vibration recognition (such as a pedometer or a knock), and the like. Other sensors such as a gyroscope, a barometer, a hygrometer, a thermometer, and an infrared sensor that may be further configured in the mobile phone 200 are not described herein.

The audio circuit 260, a loudspeaker 261, and a microphone 262 may provide an audio interface between the user and the mobile phone 200. The audio circuit 260 may transmit, to the loudspeaker 261, a signal converted from received audio data, and the loudspeaker 261 converts the signal into a sound signal and outputs the sound signal. In addition, the microphone 262 converts a collected sound signal into a signal, and the audio circuit 260 receives the signal and then converts the signal into audio data, and outputs the audio data to the RF circuit 208 to send the audio data to, for example, another mobile phone, or outputs the audio data to the memory 220 for further processing.

The I/O subsystem 270 is configured to control an external input/output device, and may include the another input device controller 271, a sensor controller 272, and a display controller 273. Optionally, one or more other input device controllers 271 receive a signal from the another input device 230 and/or send a signal to the another input device 230. The another input device 230 may include a physical button (such as a press button or a rocker button), a dial pad, a slider switch, a joystick, a click scroll wheel, and an optical mouse (the optical mouse is a touch-sensitive surface that does not display visual output, or an extension of a touch-sensitive surface formed by a touchscreen). It is worthwhile to note that input device controller 271 may be connected to any one or more of the foregoing devices. The display controller 273 in the I/O subsystem 270 receives a signal from the display screen 240 and/or sends a signal to the display screen 240. After the display screen 240 detects user input, the display controller 273 converts the detected user input into interaction with a user interface object displayed on the display screen 240, to implement human-machine interaction. The sensor controller 272 may receive a signal from one or more sensors 250 or send a signal to one or more sensors 250.

The processor 280 is a control center of the mobile phone 200, connects all parts of the entire mobile phone by using various interfaces and lines, and performs various functions of the mobile phone 200 and data processing by running or executing the software program and/or the module that are/is stored in the memory 220 and by invoking data stored in the memory 220, to overall monitor the mobile phone. In some embodiments, the processor 280 may include one or more processing units. Preferably, an application processor and a modem processor may be integrated into the processor 280. The application processor mainly processes an operating system, a user interface, an application program, and the like. The modem processor mainly processes wireless communication. It may be understood that the modem processor may alternatively not be integrated into the processor 280. In a specific embodiment of this application, the processor 280 may be configured to determine, based on first information of first DCI and/or second DCI, that a first transport block is mapped to a first code word, and a second transport block is mapped to a second code word.

The mobile phone 200 further includes the power supply 290 (for example, a battery) that supplies power to each component. In some embodiments, the power supply may be logically connected to the processor 280 by using a power management system, to implement functions such as charging management, discharging management, and power consumption management by using the power management system.

Although not shown, the mobile phone 200 may further include a camera, a Bluetooth module, and the like. Details are not described herein.

The terminal device may perform the steps performed by the terminal device in the beam management method shown in FIG. 4. Details are not described herein again. For details, refer to FIG. 4 and related content.

Figure 15:
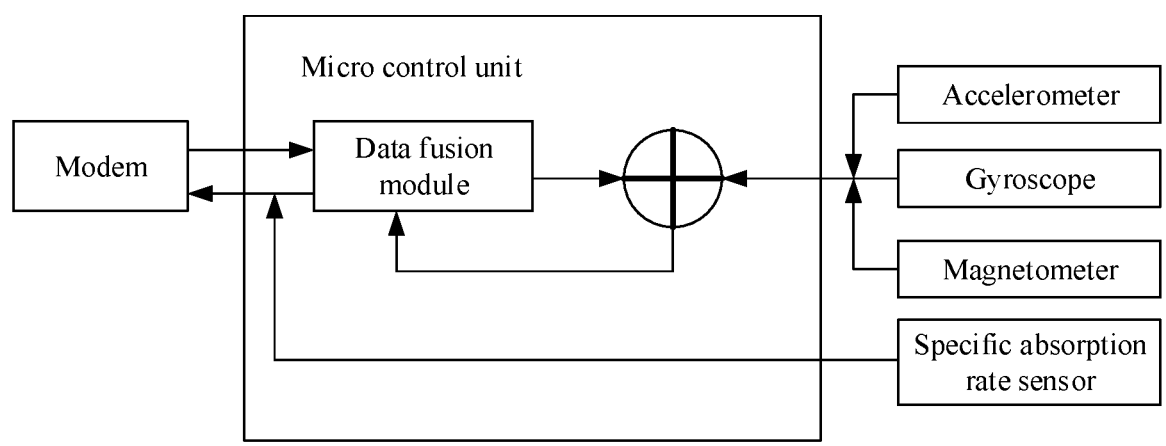
FIG. 15 is a schematic structural diagram in which a sensor in a terminal device assists beam management according to an embodiment of this application.

A beam management process of the terminal device is further described with reference to the schematic structural diagrams of the terminal device in FIG. 13 and FIG. 14. FIG. 15 is a schematic structural diagram in which a sensor in a terminal device assists beam management according to an embodiment of this application. As shown in FIG. 15, an accelerometer, a gyroscope, a magnetometer, and a specific absorption rate sensor are connected to a micro control unit in the terminal device. The accelerometer, the gyroscope, and the magnetometer perform detection to obtain detected data used to calculate a terminal device posture. It is worthwhile to note that the accelerometer, the gyroscope, and the magnetometer are used herein to obtain, through detection, the data for calculating the terminal device posture. It should be noted that alternatively, only any or any combination of the accelerometer, the gyroscope, and the magnetometer may be used to obtain, through detection, the data for calculating the terminal device posture. This is not limited in this application. The specific absorption rate sensor (namely, a sensor configured to measure an SAR (Specific Absorption Rate, also referred to as electromagnetic wave energy specific absorption rate) value) performs detection to obtain detected data used to calculate a status of a handheld antenna location. The accelerometer, the gyroscope, the magnetometer, and the specific absorption rate sensor send the detected data to a data fusion module in the micro control unit. The data fusion module performs fusion algorithm processing on the collected data, and calculates a posture change and a blocking status of the terminal device. The micro control unit sends information about a result obtained by the data fusion module through calculation to a modem module. The modem module selects a beam in a proper polarization direction with reference to information about the posture change of the terminal device and beam direction information of the terminal device. In addition, the modem module further corrects, based on a measurement result of a synchronization sequence block reference signal and/or a channel state information-reference signal, the terminal device posture obtained through calculation by using the data collected by the accelerometer, the gyroscope, and the magnetometer.

It is worthwhile to note that the accelerometer, the gyroscope, the magnetometer, the specific absorption rate sensor, and the micro control unit may be integrated into one module to perform a function of the processing module 120 in FIG. 13, and the modem module may perform a function of the correction module 130 in FIG. 13. Alternatively, the gyroscope, the magnetometer, and the specific absorption rate sensor may be integrated into one component to perform a function of the sensor 250 in FIG. 14, and the micro control unit and the modem module may be integrated into one module or component to perform a function of the processor 280 in FIG. 15.

It should be understood that the foregoing modules or components and an integration status thereof are merely examples. This is not limited in this application.

It should be understood that the foregoing modules or components and an integration status thereof are merely examples. This is not limited in this application.

The embodiments provided in this application may further include:

1. A method for improving beam management performance, including at least one of the following:

(1) in an SSB beam sweeping process, if some UE-side beams are blocked, skipping, by UE, sweeping of the beams;

(2) recording a UE posture location at a measurement moment when an SSB beam is sweeping and measuring a beam pair, and adjusting an access beam of UE based on a posture change of the UE during random access;

(3) in a random access process, when UE initiates a preamble and Msg3, recording a UE posture, and adjusting, based on a posture change, a UE-side receive beam that subsequently receives a base station side response;

(4) in a CDRX/IDRX phase, when UE wakes up from a sleep state, detecting a posture change of the UE, to ensure that the UE uses an appropriate beam to receive and send data when waking up;

(5) when UE is in a connected state but is not in a DRX state, detecting a posture change of the UE, and adjusting a receive beam and a transmit beam of the UE based on the posture change;

(6) calibrating UE posture detection by using a UE reference signal as a reference, to prevent a cumulative error of the UE posture detection; and (7) when a UE beam is a single-polarized beam (the beam is generated by one polarization of a dual-polarized antenna), if a polarization direction of the UE beam rotates, selecting a beam in another polarization direction of the UE based on an angle of rotation.

2. A terminal, where the terminal includes:
a memory, configured to store an instruction; and
a processor, configured to invoke the instruction in the memory to perform the method according to Embodiment 1.

3. A terminal, where the terminal includes a processor, a memory, and a transceiver, where
the transceiver is configured to receive and send data;
the memory is configured to store an instruction; and
the processor is configured to invoke the instruction in the memory, to perform the method according to Embodiment 1.

4. A terminal, where the terminal is configured to perform the method according to Embodiment 1.

5. A computer program product, including a computer program, where when the computer program is executed on a computer, the computer is enabled to implement the method according to Embodiment 1.

6. A computer program, where when the computer program is executed on a computer, the computer is enabled to implement the method according to Embodiment 1.

7. A computer-readable storage medium, where a computer program is stored on the computer-readable storage medium; and when the computer program is executed on a computer, the computer is enabled to perform the method according to Embodiment 1.

8. An apparatus, including a processing module and a communications interface, where the processing module is configured to perform the method according to Embodiment 1.

9. The apparatus according to Embodiment 8, where the apparatus is an element (for example, a chip) on a terminal.

All or some of the foregoing embodiments may be implemented by using software, hardware, firmware, or any combination thereof. When software is used to implement the embodiments, all or some of the embodiments may be implemented in a form of a computer program product. The computer program product includes one or more computer instructions. When the computer program instructions are loaded and executed on a computer, the procedure or the functions according to various embodiments in accordance with the present disclosure are all or partially generated. The computer may be a general-purpose computer, a special-purpose computer, a computer network, or another programmable apparatus. The computer instructions may be stored in the computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a storage disk, or a magnetic tape), an optical medium (for example, a DVD), a semiconductor medium (for example, a solid-state drive Solid State Disk (SSD)), or the like.

What is claimed is:

1. A beam management method, comprising:
in a process in which a terminal device receives, by using a first receive beam, information sent by a network device, determining a first user equipment (UE) posture of the terminal device, wherein the terminal device comprises a plurality of receive beams;
when the terminal device is changed from the first UE posture to a second UE posture, determining a second receive beam based on at least a direction relationship between the plurality of receive beams and a direction change status of the terminal device when changing from the first UE posture to the second UE posture; and
receiving, by the terminal device by using the second receive beam, the information sent by the network device.

2. The method according to claim 1, wherein the information sent by the network device comprises synchronization reference information, and the synchronization reference information comprises a channel state information-reference signal and/or a synchronization sequence block reference signal.

3. The method according to claim 1, wherein received power of channel state information-reference signal or synchronization sequence block reference signal received by using the first receive beam is greater than a first threshold.

4. The method according to claim 1, wherein in the process in which the terminal device receives, by using the first receive beam, the information sent by the network device, if the plurality of receive beams comprise a blocked receive beam, the first receive beam does not comprise the blocked receive beam.

5. The method according to claim 1, wherein when the terminal device is changed from the first UE posture to the second UE posture, if the plurality of receive beams comprise a blocked receive beam, the second receive beam does not comprise the blocked receive beam.

6. The method according to claim 4, wherein determining the first UE posture of the terminal device comprises:
in the process in which the terminal device receives, by using the first receive beam, the information sent by the network device, obtaining a UE posture parameter n times, calculating an average of UE posture parameters obtained n times, and determining a UE posture corresponding to the average as the first UE posture, wherein n is a positive integer greater than or equal to 1.

7. The method according to claim 1, wherein in a random access process, if the second UE posture is a posture corresponding to the terminal device when the terminal device sends a random access preamble, before the receiving, by the terminal device by using the second receive beam, the information sent by the network device, the method further comprises: sending, by the terminal device, the random access preamble by using the second receive beam.

8. A non-transitory computer storage medium, comprising instructions, wherein when the instructions are run on a terminal device, the terminal device is enabled to perform the method according to claim 1.

9. A terminal device, comprising:
a transceiver module, configured to receive information sent by a network device; and
a processing module, configured to determine a first user equipment (UE) posture of the terminal device in a process in which the transceiver module receives, by using a first receive beam, the information sent by the network device, wherein the terminal device comprises a plurality of receive beams;
the processing module is further configured to: when the terminal device is changed from the first UE posture to a second UE posture, determine a second receive beam based on a direction relationship between the plurality of receive beams and a direction change status of the terminal device when changing from the first UE posture to the second UE posture; and
the transceiver module is further configured to receive, by using the second receive beam, the information sent by the network device.

10. The terminal device according to claim 9, wherein the information sent by the network device comprises synchronization reference information, and the synchronization reference information comprises a channel state information-reference signal and/or a synchronization sequence block reference signal.

11. The terminal device according to claim 9, wherein received power of channel state information-reference signal or synchronization sequence block reference signal received by using the first receive beam is greater than a first threshold.

12. The terminal device according to claim 9, wherein in the process in which the terminal device receives, by using the first receive beam, the information sent by the network device, if the plurality of receive beams comprise a blocked receive beam, the first receive beam does not comprise the blocked receive beam.

13. The terminal device according to claim 9, wherein when the terminal device is changed from the first UE posture to the second UE posture, if the plurality of receive beams comprise a blocked receive beam, the second receive beam does not comprise the blocked receive beam.

14. The terminal device according to claim 12, wherein the processing module is further configured to: in the process in which the transceiver module receives, by using the first receive beam, the information sent by the network device, obtain a UE posture parameter n times, calculate an average of UE posture parameters obtained n times, and determine a posture corresponding to the average as the first UE posture, wherein n is a positive integer greater than or equal to 1.

15. The terminal device according to claim 9, wherein if the second UE posture is a posture corresponding to the terminal device when the terminal device sends a random access preamble, before the transceiver module receives, by using the second receive beam, the information sent by the network device, the transceiver module is further configured to send the random access preamble by using the second receive beam.

16. The terminal device according to claim 9, wherein if the second UE posture is a posture corresponding to the terminal device when the terminal device receives a random access response sent by the network device, the transceiver module is further configured to receive, by using the second receive beam, the random access response sent by the network device.

17. The terminal device according to claim 9, wherein in a contention-based random access process, if the second UE posture is a posture corresponding to the terminal device when the terminal device receives a contention resolution response message sent by the network device, the transceiver module is further configured to receive, by using the second receive beam, the contention resolution response message sent by the network device.

18. The terminal device according to claim 9, wherein when the terminal device is in a connected discontinuous reception state or an idle discontinuous reception state, the first UE posture comprises a posture corresponding to the terminal device before the terminal device enters sleep, and the second UE posture comprises a posture corresponding to the terminal device when the terminal device wakes up.

19. The terminal device according to claim 9, wherein the terminal device further comprises a correction module, configured to: in the process in which the transceiver module receives, by using the first receive beam, the information sent by the network device, if received power of synchronization reference information received by the terminal device in a third UE posture is greater than received power of the synchronization reference information received by the terminal device in a fourth UE posture, correct the first UE posture to the third UE posture.

20. The terminal device according to claim 9, wherein when the plurality of receive beams are formed by using a single-polarized antenna, if a rotation angle between the first UE posture and the second UE posture is less than a second threshold, a polarization direction of the second receive beam is the same as a polarization direction of the first receive beam; or if a rotation angle between the first UE posture and the second UE posture is greater than a first threshold, a polarization direction of the second receive beam is different from a polarization direction of the first receive beam.

* * * * *